United States Patent
Li et al.

(10) Patent No.: US 12,309,747 B2
(45) Date of Patent: May 20, 2025

(54) SYSTEM AND METHOD FOR PATTERN-BASED SIDELINK SCHEDULING

(71) Applicant: QUALCOMM Incorporated, San Diego, CA (US)

(72) Inventors: Junyi Li, Chester, NJ (US); Tao Luo, San Diego, CA (US); Jung Ho Ryu, Fort Lee, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 15/930,382

(22) Filed: May 12, 2020

(65) Prior Publication Data
US 2020/0396716 A1    Dec. 17, 2020

Related U.S. Application Data

(60) Provisional application No. 62/862,594, filed on Jun. 17, 2019.

(51) Int. Cl.
*H04W 72/02* (2009.01)
*H04W 72/04* (2023.01)
(Continued)

(52) U.S. Cl.
CPC ....... *H04W 72/02* (2013.01); *H04W 72/0446* (2013.01); *H04W 72/23* (2023.01);
(Continued)

(58) Field of Classification Search
CPC ..... H04W 72/23; H04W 72/02; H04W 72/20; H04W 72/04; H04W 72/542; H04W 88/02
See application file for complete search history.

(56) References Cited

U.S. PATENT DOCUMENTS

| | | |
|---|---|---|
| 10,854,022 B2 | 12/2020 | Patil et al. |
| 2014/0177542 A1* | 6/2014 | Novak ........... H04W 72/23 370/329 |

(Continued)

FOREIGN PATENT DOCUMENTS

| | | |
|---|---|---|
| CA | 3073572 A1 | 5/2019 |
| WO | 2018052631 | 3/2018 |
| WO | 2018094872 A1 | 5/2018 |

OTHER PUBLICATIONS

International Search Report and Written Opinion—PCT/US2020/032752—ISA/EPO—Aug. 7, 2020.

(Continued)

*Primary Examiner* — Sai Aung
(74) *Attorney, Agent, or Firm* — Arent Fox, LLP

(57) ABSTRACT

A first apparatus may receive, from a base station, information associated with sidelink communication. The first apparatus may determine, based on the information associated with sidelink communication, a sidelink communication pattern associated with a second UE. The first apparatus may communicate with the second UE on a first sidelink channel based on the sidelink communication pattern associated with the second UE. A second apparatus may determine a resource allocation associated with sidelink communication. The second apparatus may broadcast information indicating the resource allocation associated with sidelink communication. The second apparatus may refrain from scheduling any UEs on the resource allocation associated with sidelink communication.

21 Claims, 13 Drawing Sheets

(51) Int. Cl.
*H04W 72/0446* (2023.01)
*H04W 72/12* (2023.01)
*H04W 72/23* (2023.01)
*H04W 72/50* (2023.01)
*H04W 72/543* (2023.01)
*H04W 72/56* (2023.01)
*H04W 92/18* (2009.01)

(52) U.S. Cl.
CPC ....... *H04W 72/535* (2023.01); *H04W 72/543* (2023.01); *H04W 72/56* (2023.01); *H04W 92/18* (2013.01)

(56) References Cited

U.S. PATENT DOCUMENTS

| | | | | |
|---|---|---|---|---|
| 2016/0044665 A1* | 2/2016 | Novlan | ................ | H04W 72/20 370/336 |
| 2016/0157254 A1* | 6/2016 | Novlan | ................ | H04W 72/10 370/329 |
| 2017/0196018 A1* | 7/2017 | Zeng | .................... | H04W 72/23 |
| 2017/0201461 A1* | 7/2017 | Cheng | ................. | H04L 47/286 |
| 2017/0215119 A1* | 7/2017 | Hong | ............... | H04W 36/0072 |
| 2017/0257876 A1* | 9/2017 | Loehr | ............... | H04W 28/0278 |
| 2017/0353819 A1 | 12/2017 | Yin et al. | | |
| 2018/0054745 A1* | 2/2018 | Wu | .................. | H04W 72/1273 |
| 2018/0295646 A1 | 10/2018 | Faurie et al. | | |
| 2018/0324848 A1 | 11/2018 | Baghel et al. | | |
| 2019/0020987 A1* | 1/2019 | Khoryaev | ........... | H04W 72/042 |
| 2019/0053251 A1 | 2/2019 | Loehr et al. | | |
| 2020/0008030 A1* | 1/2020 | Kim | ..................... | H04W 72/23 |
| 2020/0252871 A1* | 8/2020 | Chae | ................ | H04W 52/0274 |
| 2021/0127365 A1* | 4/2021 | Wang | ................. | H04W 72/542 |
| 2021/0212023 A1* | 7/2021 | Zeng | ....................... | H04W 4/40 |
| 2021/0227364 A1* | 7/2021 | Muehleisen | .......... | H04W 72/14 |
| 2021/0266868 A1* | 8/2021 | Shin | ...................... | H04L 1/0061 |
| 2021/0274390 A1* | 9/2021 | Kifle | ................. | H04W 36/0009 |
| 2022/0039080 A1* | 2/2022 | Khoryaev | ............... | H04W 4/40 |
| 2022/0078670 A1* | 3/2022 | Kung | .................... | H04W 36/04 |
| 2022/0078818 A1* | 3/2022 | Sun | ........................ | H04L 67/535 |

OTHER PUBLICATIONS

Huawei., et al., "Sidelink Link Adaptation with Feedback Information for FeD2D", 3GPP TSG RAN WG1 Meeting #89, R1-1707041, Hangzhou, China, May 15-19, 2017, 2 Pages.

* cited by examiner

SYSTEM AND METHOD FOR PATTERN-BASED SIDELINK SCHEDULING

CROSS REFERENCE TO RELATED APPLICATION(S)

This application claims the benefit of U.S. Provisional Application Ser. No. 62/862,594, entitled "SYSTEM AND METHOD FOR PATTERN-BASED SIDELINK SCHEDULING" and filed on Jun. 17, 2019, which is expressly incorporated by reference herein in its entirety.

BACKGROUND

Technical Field

The present disclosure relates generally to communications systems, and more particularly, to centralized scheduling of communication on at least one sidelink channel.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various radio access technologies (RATs), two or more user equipment (UE) may directly communicate with one another. Direct communication between the two or more UEs may be known as sidelink communication, and may occur on one or more sidelink channels.

In some existing approaches, direct communication between two or more UEs may be controlled by a base station. Specifically, the base station may schedule two UEs that are to directly communicate on a set of resources. The UEs may then transmit and receive according to the schedule controlled by the base station. However, scheduling direct communication between UEs by a base station may increase over-the-air signaling and increase the computational load on the base station. In addition, scheduling direct communication between UEs by a base station may increase the latency experienced by the UEs in directly communicating. Therefore, a need exists to improve the performance and/or efficiency of sidelink communication.

The present disclosure may present techniques and approaches to address the performance and/or efficiency of sidelink communication. For example, the present disclosure may describe a distributed approach to sidelink scheduling. According to this distributed approach, a base station may refrain from scheduling UEs on a set of resources allocated for the sidelink communication. Instead, UEs may communicate according to a sidelink communication pattern. The sidelink communication pattern may define which UE will act as a transmitter and which UE will act as a receiver in a slot allocated for sidelink communication between the UEs. The sidelink communication pattern may be negotiated by the UEs without base station control. In so doing, over-the-air signaling from the base station may be reduced and, further, computational load on the base station may be reduced. In addition, latency in sidelink communication may be reduced because UEs may not need to rely on the base station for scheduling direct communication between the UEs.

In another example, the present disclosure may describe a centralized approach to sidelink scheduling. According to this centralized approach, a base station may assist sidelink communication between UEs by determining the sidelink communication pattern. The sidelink communication pattern may define which UE will act as a transmitter and which UE will act as a receiver based on information associated with the UEs. In so doing, over-the-air signaling between the UEs may be reduced and, further, computational load on the UEs may be reduced (e.g., relative to negotiating the sidelink communication pattern by the UEs). In addition, latency in sidelink communication may be reduced because UEs may not need to negotiate to determine the sidelink communication pattern.

In a first aspect of the disclosure, a first method, a first computer-readable medium, and a first apparatus are provided. The first apparatus may be a UE that may act as a transmitter or a receiver on one or more sidelink channels. The first apparatus may receive, from the base station, information associated with sidelink communication. The first apparatus may determine, based on the information associated with sidelink communication, a sidelink communication pattern associated with a second UE. The first apparatus may communicate with the second UE on a first sidelink channel based on the sidelink communication pattern associated with the second UE.

In a second aspect of the disclosure, a second method, a second computer-readable medium, and a second apparatus are provided. The second apparatus may be a base station. The second apparatus may determine a resource allocation associated with sidelink communication. The second apparatus may broadcast information indicating the resource allocation associated with sidelink communication. The second apparatus may refrain from scheduling any UEs on the resource allocation associated with sidelink communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
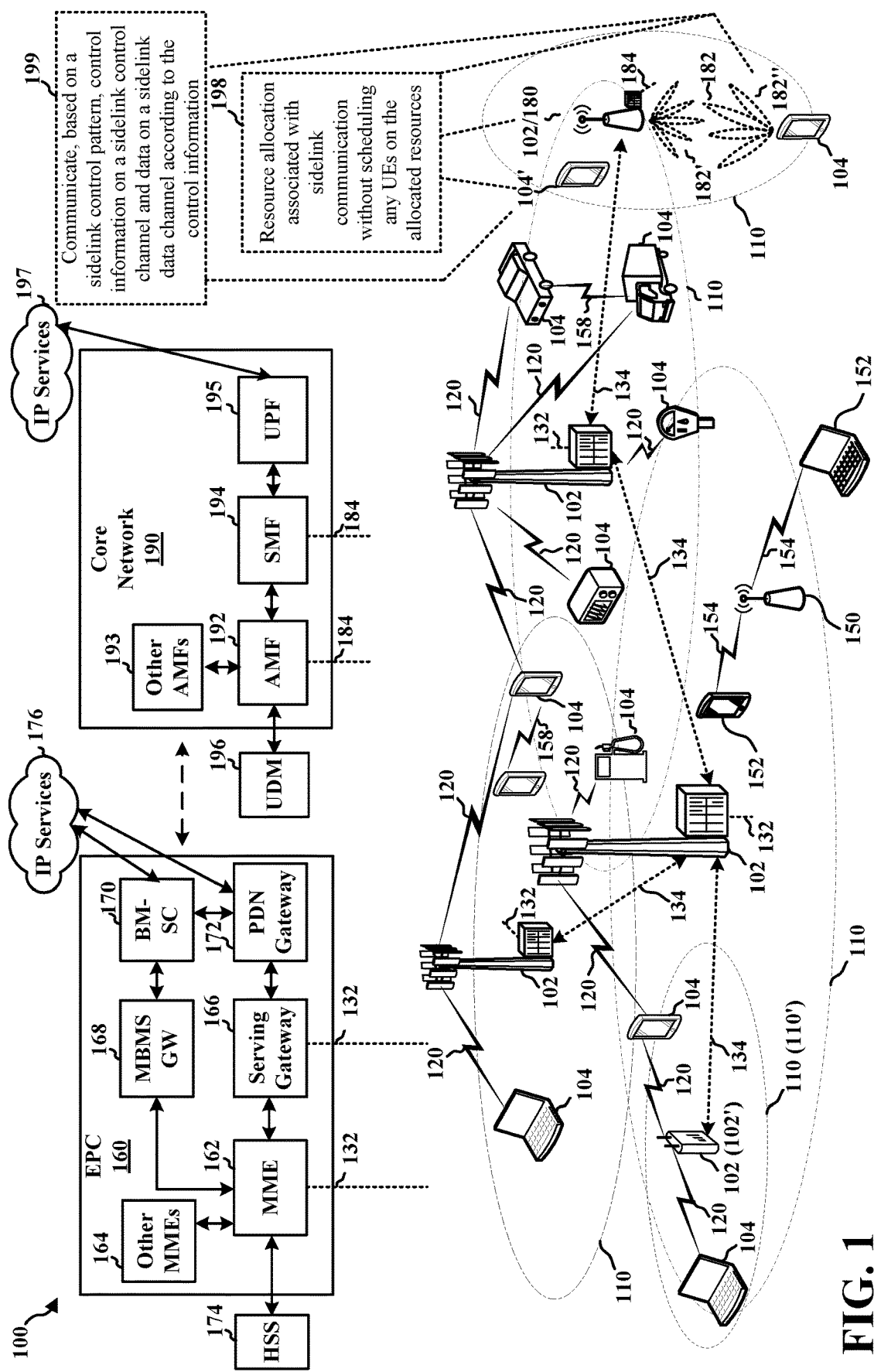
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-A, Code Division Multiple Access (CDMA), Global System for Mobile communications (GSM), and/or other wireless/radio access technologies.

Referring again to FIG. 1, in certain aspects, at least two UEs 104, 104' may directly communicate on one or more sidelink channels. For example, when the two UEs 104, 104' communicate data on a sidelink data channel, the transmitting UE 104 may send the data directly to the receiving UE 104' on the sidelink data channel such that the data does not traverse a base station 102/180, EPC 160, and/or other core network 190. According to various aspects, the direct communication may include D2D communication, vehicle-to-everything (V2X) communication, infrastructure-to-everything (I2X) communication, and the like.

While data directly communicated between the UEs 104, 104' may not traverse the base station 102/180, the sidelink communication between the UEs 104, 104' may be scheduled in either a centralized or a distributed manner. According to the centralized approach, the base station 102/180 may facilitate the sidelink communication by generating a sidelink communication pattern, which may configure a first UE 104 as a transmitter in sidelink communication and configure a second UE 104' as the receiver for sidelink communication. In so doing, the base station 102/180 may reduce scheduling conflicts between the UEs 104, 104', reduce interference experienced in a coverage area 110/110' of the base station 102/180 when the two UEs 104, 104' directly communicate, and so forth.

According to the distributed approach, the base station 102/180 may broadcast information indicating a set of resources allocated for sidelink communication without scheduling any UEs on the allocated set of resources (198). That is, the base station 102/180 may allocate the set of resources within a coverage area 110/110' of the base station 102/180 for any sidelink communication between any UEs within the coverage area 110/110', but may not schedule the sidelink communication on that allocated set of resources. In some aspects of such a distributed approach to sidelink scheduling, the base station 102/180 may refrain from configuring one or more of a modulation and coding scheme (MCS) for sidelink communication, information associated with a hybrid automatic repeat request (HARM) process for sidelink communication, transmission/reception by UEs on the allocated set of resources, an index associated with a beam for sidelink communication, and/or other scheduling information associated with sidelink communication.

Rather, with the distributed approach to sidelink scheduling, the UEs 104, 104' may negotiate the sidelink communication pattern in order to determine which of the UEs 104, 104' is to act as the transmitter and which of the UEs 104, 104' is to act as the receiver. With the distributed approach, over-the-air signaling by the base station 102/180 and computational load on the base station 102/180 may be reduced, while latency experienced between the UEs 104, 104' in sidelink communication may also be reduced.

According to both the centralized and distributed approaches for scheduling sidelink communication, each of the UEs 104, 104' may communicate, based on the sidelink communication pattern, control information on a sidelink control channel and data on a sidelink data channel (199). For example, the sidelink communication pattern may configure the first UE 104 as the transmitter in a first slot of the set of resources allocated by the base station 102/180 for sidelink communication. Pursuant to the transmitter configuration, the first UE 104 may schedule data on the sidelink data channel for the second UE 104', which may be configured as the receiver in the first slot according to the sidelink communication pattern.

Further to the sidelink communication of control information on the sidelink control channel and data on the sidelink data channel (199), the first UE 104 may send the data on the sidelink data channel based on the control information, which may indicate the schedule for the sidelink data channel determined by the first UE 104. Based on the control information on the sidelink control channel, the second UE 104' may receive and decode the data on the sidelink data channel from the first UE 104.

To engage in direct communication, the transmitting UE 104 may schedule data on a sidelink data channel. In scheduling data on the sidelink data channel, the transmitting UE 104 may determine a set of parameters associated with the sidelink communication. The set of parameters may include information that enables the receiving UE 104' to successfully detect and decode the data sent on the sidelink data channel. Examples of one or more of the set of parameters include a modulation and coding scheme (MCS) for communication on a sidelink data channel, information associated with a hybrid automatic repeat request (HARM)

process for the sidelink data channel, a set of resources allocated on the sidelink data channel, an index associated with a beam for the communication on the sidelink data channel, and/or other scheduling information.

Based on the received information indicating the set of resources allocated for the sidelink control channel, the transmitting UE 104 may send the set of parameters to the receiving UE 104. That is, the transmitting UE 104 may send the set of parameters to the receiving UE 104' on one or more time/frequency resources indicated by the base station 102/180 in the information on the downlink control channel.

Because the receiving UE 104' received the same information on the downlink control channel from the base station 102/180, the receiving UE 104' may successfully detect and decode the set of parameters sent by the transmitting UE 104 on the sidelink control channel. The receiving UE 104' may use the received set of parameters to detect and decode data on the sidelink data channel.

The transmitting UE 104 may subsequently send data to the receiving UE 104' on the sidelink data channel based on the set of parameters. The receiving UE 104' may successfully detect and decode the data on the sidelink data channel based on the received set of parameters. Accordingly, the transmitting and receiving UEs 104/104' may communicate sidelink control information on the sidelink control channel and communicate sidelink data on the sidelink data channel based on the sidelink control information (199).

Figure 2:
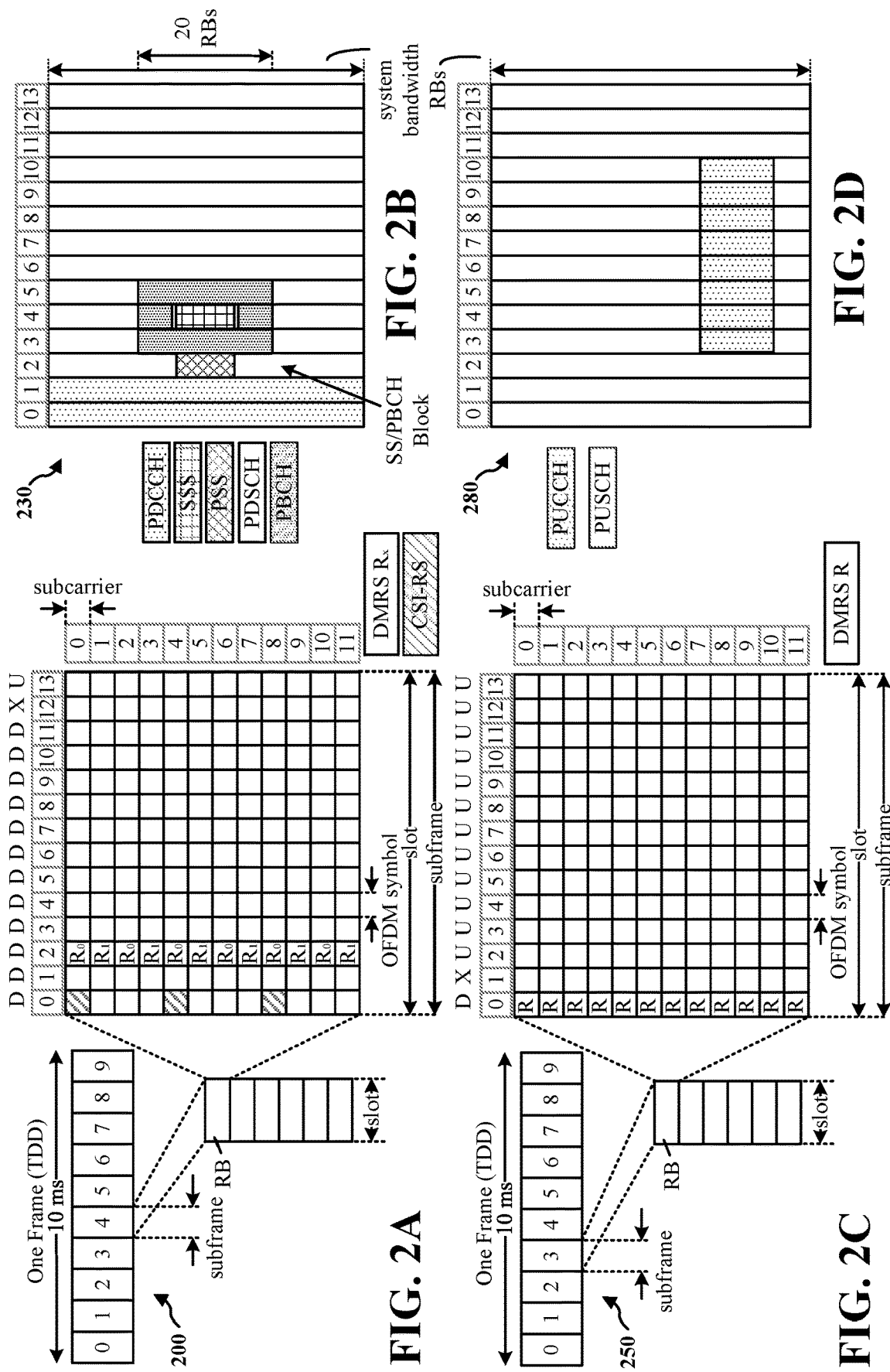
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
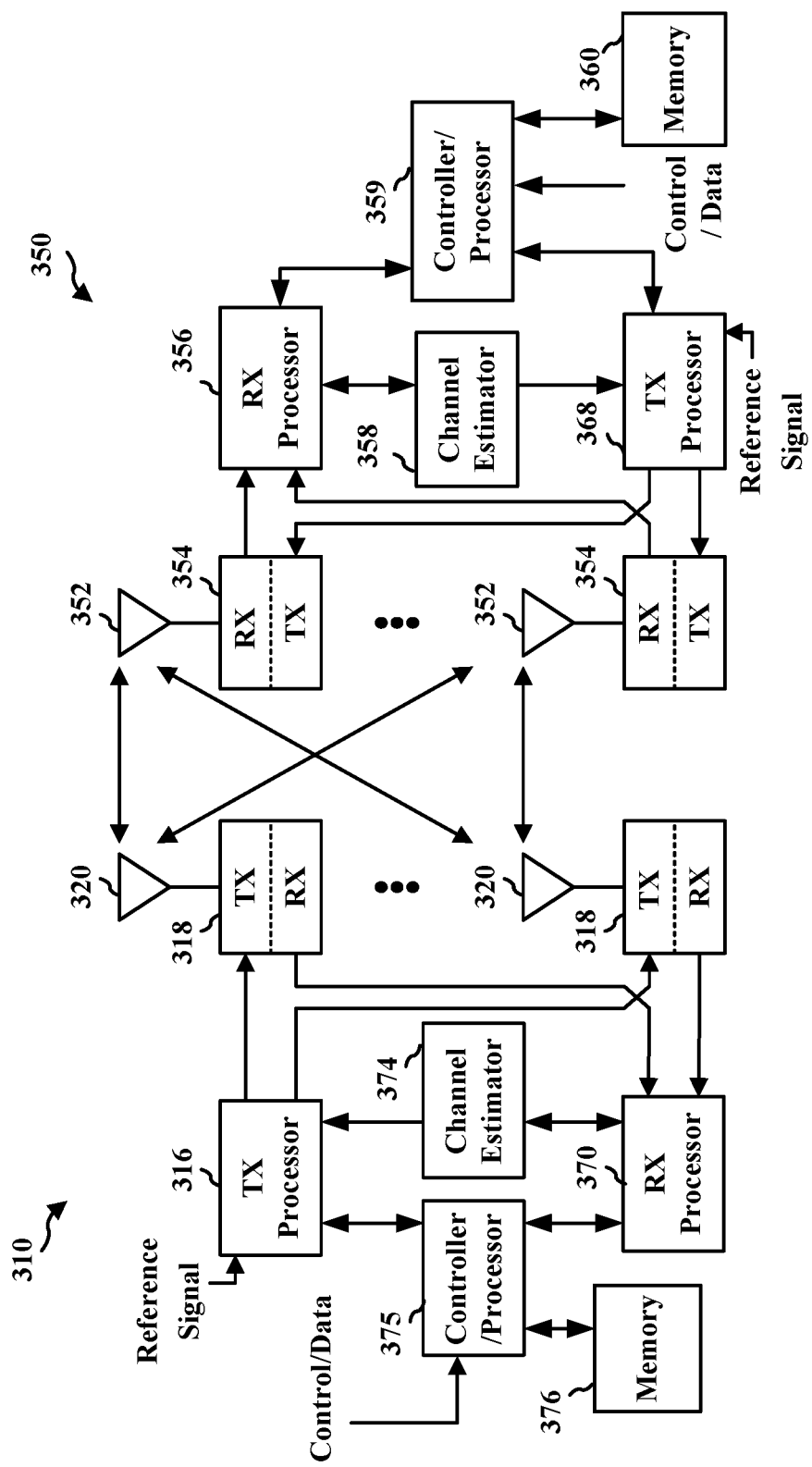
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

According to some aspects, at least one of the TX processor 316, the RX processor 370, and the controller/processor 375 may be configured to perform aspects in connection with (198) of FIG. 1.

According to some other aspects, at least one of the TX processor 368, the RX processor 356, and the controller/processor 359 may be configured to perform aspects in connection with (199) of FIG. 1.

Referring to FIGS. 4-9, as described, supra, two UEs may directly communicate with one another on one or more sidelink channels; that is, the two UEs may engage in sidelink communication so that data sent from one UE traverse neither a base station nor a core network. In order to communicate on the one or more sidelink channels a set of resources may be allocated for sidelink communication. Further, the sidelink communication may be coordinated so that the transmission/reception times of a first UE do not conflict with those transmission/reception times of a second UE that is to directly communicate with the first UE.

In some existing approaches, direct communication between two or more UEs may be scheduled by a base station. For example, the base station may configure the various parameters for communication on the one or more sidelink channels, including one set of slots in which one UE acts as a transmitter to another UE acting as the receiver. However, scheduling sidelink communication by a base station may increase computational load on the base station and over-the-air signaling, as well as increasing the latency experienced during the sidelink communication. Therefore, a need exists to improve the performance and/or efficiency of sidelink communication.

FIGS. 4-9 may present techniques and approaches to address the performance and/or efficiency of sidelink communication. For example, FIG. 4 may describe a centralized approach to sidelink scheduling in which a base station configures a TX/RX sidelink communication pattern, and FIG. 5 may describe a distributed approach to sidelink scheduling in which each UE pair configures scheduling for the sidelink communication of that UE pair.

Figure 4:
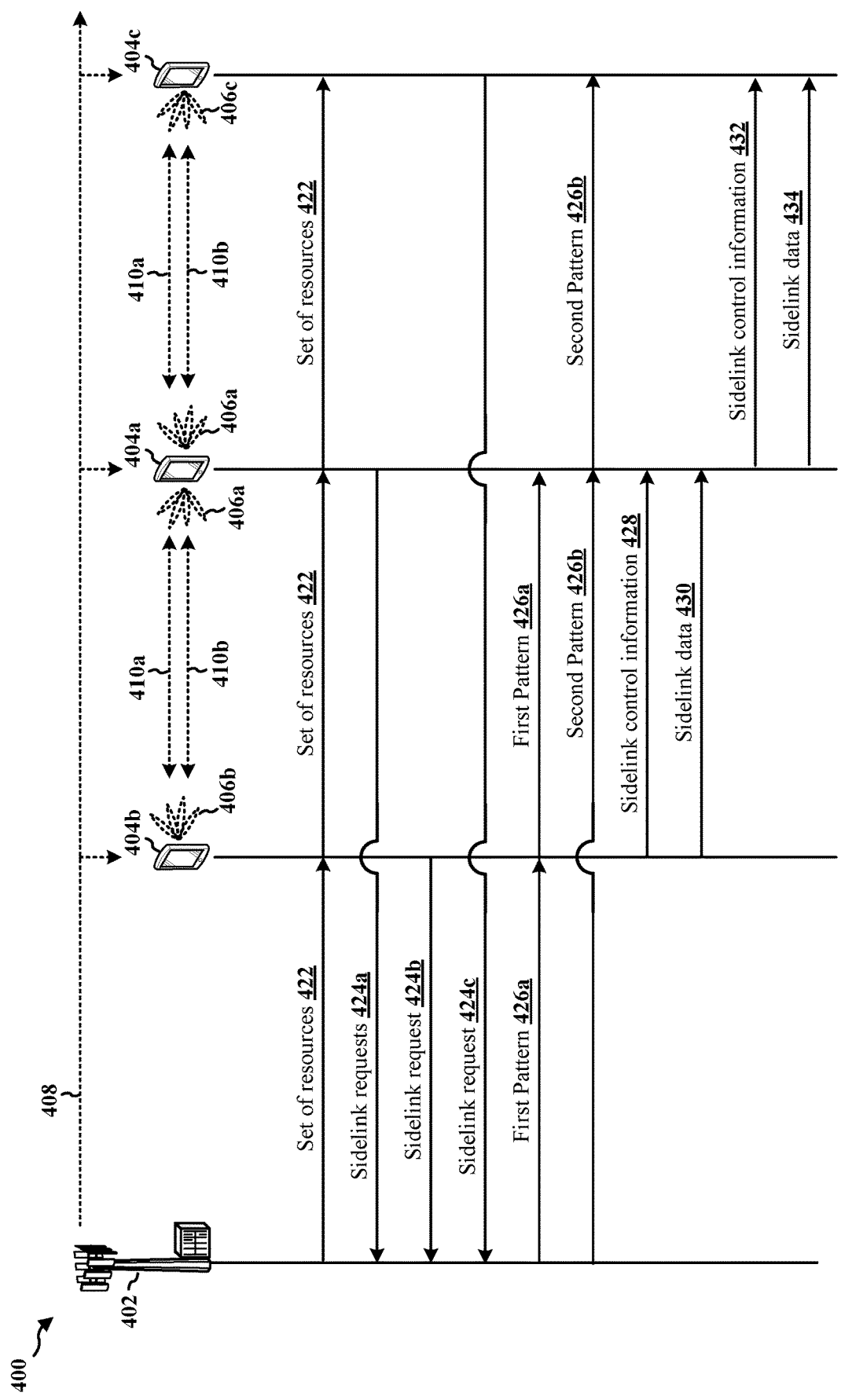
FIG. 4 is a diagram illustrating a call flow between a set of UEs and a base station for wireless sidelink communication between pairs of UEs.

FIG. 4 is a diagram illustrating a call flow 400 for a centralized configuration of a sidelink communication pattern. According to the call flow 400, a base station 402 may facilitate the sidelink communication between UE pairs, a first of which may include a first UE 404a and a second UE 404b and a second of which may include the first UE 404a and a third UE 404c. In the context of FIG. 1, the base station 402 may be implemented as the base station 102/180 and each of the UEs 404a, 404b, 404c may be implemented as one of the UEs 104, 104'. In the context of FIG. 3, the base station 402 may be implemented as the base station 310, and each of the UEs 404a, 404b, 404c may be implemented as the UE 350.

One or more of the UEs 404a, 404b, 404c may communicate with the base station 402. For example, one or more of the UEs 404a, 404b, 404c may be synchronized with the base station 402 following a respective random access channel (RACH) procedure respectively performed by the one or more of the UEs 404a, 404b, 404c. When the one or more of the UEs 404a, 404b, 404c communicates with the base station 402, the communication may occur on an access link. Examples of such an access link may include the Uu interfaces defined for LTE and/or 5G NR.

The base station 402 may provide a cell or geographic coverage area (e.g., the geographic coverage areas 110/110' of FIG. 1), and each of the UEs 404a, 404b, 404c may be within the cell. The base station 402 may be configured to broadcast information, which may be received by the UEs 404a, 404b, 404c when within the cell. In some aspects, one or more of the UEs 404a, 404b, 404c may receive this broadcast information even when not operating on the cell (e.g., when unsynchronized with the cell).

Communication on the access link between the base station 402 and at least one of the UEs 404a, 404b, 404c may be carried on at least one channel. For example, when the base station 402 broadcasts information, the information may be carried on a downlink broadcast channel 408. An example of the downlink broadcast channel 408 may include the PBCH.

According to various aspects, each of the UEs 404a, 404b, 404c may directly communicate with another one of the UEs 404a, 404b, 404c. The direct communication between the UEs 404a, 404b may be referred to as sidelink communication, and may include D2D communication, V2X communication, I2X communication, or another similar communication protocol in which data directly communicated between the UEs 404a, 404b, 404c traverses neither the base station 402 nor the EPC (or other core network).

For sidelink communication, the UEs 404a, 404b, 404c may directly communicate with one another over a sidelink. Examples of such a sidelink may include the PC5 interfaces defined for V2X in LTE and/or 5G NR. Like the access link, communication on the sidelink may be carried on at least one channel.

On the sidelink, control information may be carried on a sidelink control channel 410a, such as the PSCCH. Data on the sidelink, however, may be carried on a sidelink data channel 410b, which may also be referred to as a sidelink shared channel. An example of the sidelink data channel 410b may include the PSSCH.

To directly receive data on the sidelink data channel 410b, the data may be scheduled on a set of resources on the sidelink data channel 410b. Scheduling information for the data on the sidelink data channel 410b may be carried on the sidelink control channel 410a. Thus, in order to directly communicate data on the sidelink data channel 410b, each of the UEs 404a, 404b, 404c may first receive and decode the sidelink control channel 410a.

Sidelink communication in the cell may overlap with access link communication in the cell and, therefore, the base station 402 may allocate a set of resources 422 for sidelink communication in the cell. By allocating the set of resources 422 for sidelink communication, the base station 402 may reduce or prevent conflicts, interference, and the link on resources in the cell. The set of resources 422 may include a set of PRBs and/or time/frequency resources.

In one aspect, the base station 402 may semi-statically allocate the set of resources 422 for sidelink communication. In another aspect, the base station 402 may adaptively allocate the set of resources 422 for sidelink communication. The base station 402 may adaptively allocate the set of resources 422 for sidelink communication on a slow time scale. The slow time scale may indicate the duration for which the resource allocation for sidelink communication is valid. For example, the base station 402 may allocate every even-numbered slot for sidelink communication for the next 5 minutes, and 5 minutes may be the slow time scale. The slow time scale may be of a duration that is at least approximately 100 milliseconds (ms); although the slow time scale may be appreciably greater than 100 ms, such as 30 seconds, 10 minutes, etc.

The base station 402 may indicate the allocated set of resources 422 via broadcast. Thus, the downlink broadcast channel 408 may carry information indicating the allocated set of resources 422. Each of the UEs 404a, 404b, 404c may receive the information indicating the allocated set of resources 422 when within the cell provided by the base station 402. In some aspects, one of the UEs 404a, 404b, 404c may receive the information indicating the allocated set of resources 422 regardless of whether that one of the UEs 404a, 404b, 404c is operating on a cell provided by the base station 402. For example, the first UE 404a may receive the information indicating the allocated set of resources 422 even though the first UE 404a may not have acquired timing synchronization with the base station, as the information indicating the allocated set of resources 422 is broadcast and therefore may not be scrambled with cell-specific and/or UE-specific information.

For the sidelink communication on the allocated set of resources 422, each of the UEs 404a, 404b, 404c may identify another one of the UEs 404a, 404b, 404c, e.g., in order to establish a UE pair for sidelink communication. The UEs 404a, 404b, 404c may identify another one of the UEs 404a, 404b, 404c with which to engage in sidelink communication based on the discovery phase. The discovery phase may occur on a sidelink discovery channel (e.g., PSDCH), on which one of the UEs 404a, 404b, 404c may announce a service provided by that one of the UEs 404a, 404b, 404c while another one of the UEs 404a, 404b, 404c may determine that the announced service is of interest to that other one of the UEs 404a, 404b, 404c.

According to various aspects, the discovery phase (or another phase between a pair of the UEs 404a, 404b, 404c) may include a beam training process between the pair of UEs 404a, 404b, 404c. Sidelink communication may occur in a mmW spectrum and/or near-mmW spectrum. For example, one or more 3GPP standards for 5G NR may define communication in mmW and/or near-mmW frequencies. The beam training process may allow a pair of the UEs 404a, 404b, 404c to identify the best TX/RX beam pairs between that pair of the UEs 404a, 404b, 404c.

During the beam training process, one of the pair of the UEs 404a, 404b, 404c may sweep through a plurality of TX directions and send at least one reference signal in each of the plurality of TX directions. Correspondingly, the other of the pair of the UEs 404a, 404b, 404c may sweep through a plurality of RX directions and detect each reference signal sent in each of the plurality of TX directions.

The other of the pair of the UEs 404a, 404b, 404c may identify a "best" RX beam in each of the RX directions, and the best RX beam in each of the RX directions may correspond to the RX beam on which a reference signal is received having a highest measured quality (e.g., highest signal-to-noise ratio (SNR), highest reference signal receive power (RSRP), etc.).

In each of the RX directions, the other of the pair of the UEs 404a, 404b, 404c may determine a beam pair for receiving in an RX direction by correlating the best RX beam in a respective direction with the TX beam on which the reference signal is transmitted. The other of the pair of the UEs 404a, 404b, 404c may identify the TX beam to correlate with the best RX beam to form the beam pair based on the respective reference signal received in that RX direction and/or based on at least one resource on which the respective reference signal is received, at least one of which may indicate an index of the TX beam on which the respective reference signal is sent by the one of the pair of the UEs 404a, 404b, 404c.

After the one of the pair of the UEs 404a, 404b, 404c first acts as the transmitter and the other of the pair of the UEs 404a, 404b, 404c acts as the receiver when sweeping through the plurality of TX/RX directions, the pair of the UEs 404a, 404b, 404c may switch functions. Thus, the other of the pair of the UEs 404a, 404b, 404c may sweep through each of the plurality of TX directions and, in each of the plurality of TX directions, the other of the pair of the UEs 404a, 404b, 404c may send a respective reference signal on a respective TX beam.

Correspondingly, the one of the pair of the UEs 404a, 404b, 404c may sweep through a plurality of RX directions and detect each reference signal sent in each of the plurality of TX directions by the other of the pair of the UEs 404a, 404b, 404c. The one of the pair of the UEs 404a, 404b, 404c may therefore identify a beam pair for each TX/RX direction, as described supra.

In the illustrated aspect, the first UE 404a may establish a first UE pair with the second UE 404b and may establish a second UE pair with the third UE 404c based on the discovery phase. While the first pair of UEs 404a, 404b and the second pair of UEs 404a, 404c may be established and the set of resources 422 for sidelink communication may be allocated, the sidelink communication for the first pair of UEs 404a, 404b and the second pair of UEs 404a, 404c may be unscheduled.

In order to schedule sidelink communication between the first pair of UEs 404a, 404b and the second pair of UEs 404a, 404c, a respective sidelink communication pattern may be configured for each of the first pair of UEs 404a, 404b and the second pair of UEs 404a, 404c. A sidelink communication pattern may schedule which UE of a UE pair is to act as a transmitter and which UE of that UE pair is to act as a receiver, e.g., in a slot of the allocated set of resources 422.

In scheduling one UE of a UE pair as the transmitter and another UE of the UE pair as the receiver, each UE of the UE pair may identify a beam via which to transmit or receive. Thus, each UE of the UE pair may determine a beam associated with communicating with the other UE of the UE pair based on the sidelink communication pattern.

In the illustrated aspect of FIG. 4, sidelink communication patterns may be configured in a centralized manner by the base station 402. To obtain a sidelink communication pattern, however, the first pair of UEs 404a, 404b and the second pair of UEs 404a, 404c may first inform the base station 402 of the first pair of UEs 404a, 404b and the second pair of UEs 404a, 404c.

Accordingly, the first UE 404a may send sidelink requests 424a to the base station 402: one of which may indicate that the first UE 404a is paired with the second UE 404b and another of which may indicate that the first UE 404a is paired with the third UE 404c. Similarly, the second UE 404b may send a second sidelink request 424b to the base station 402 indicating that the second UE 404b is paired with the first UE 404a. The third UE 404c may send a third sidelink request 424c to the base station 402 indicating that the third UE 404c is paired with the first UE 404a.

A respective one of the sidelink requests 424a, 424b, 424c may indicate the respective identifiers (IDs) of the respective pair of UEs 404a, 404b, 404c. For example, one of the sidelink requests 424a may indicate a first ID of the first UE 404a and a second ID of the second UE 404b, while the other of the sidelink requests 424a may indicate the first ID of the first UE 404a and a third ID of the third UE 404c. The second sidelink request 424b may indicate the second ID of the second UE 404b and the first ID of the first UE 404a. The third sidelink request 424c may indicate the third ID of the third UE 404c and the first ID of the first UE 404a.

According to various aspects, one or more of the sidelink requests 424a, 424b, 424c may further indicate at least one of QoS information and/or priority information. The QoS information may indicate a QoS expected for the service communicated between a pair of the UEs 404a, 404b, 404c. The priority information may indicate a priority of the sidelink communication between a pair of the UEs 404a, 404b, 404c relative to other sidelink communication between another pair of the UEs 404a, 404b, 404c.

The base station 402 may receive the sidelink requests 424a, 424b, 424c from each of the UEs 404a, 404b, 404c. According to a centralized approach, the base station 402 may determine a respective sidelink communication pattern 426a, 426b for each pair of the UEs 404a, 404b, 404c indicated by the sidelink requests 424a, 424b, 424c.

The base station 402 may determine a respective sidelink communication pattern 426a, 426b based on the pair of the UEs 404a, 404b, 404c, such as based on the schedules of the pair of the UEs 404a, 404b, 404c. For example, the base station 402 may determine a first sidelink communication pattern 426a for the pair of the first UE 404a and the second UE 404b based on the schedules of the first UE 404a and the second UE 404b.

In determining each of the respective sidelink communication patterns 426a, 426b, the base station 402 may attempt to accommodate each of the sidelink requests 424a, 424b, 424c. For example, the base station 402 may determine each of the respective sidelink communication patterns 426a, 426b such that conflicts between pairs of the UEs 404a, 404b, 404c are avoided.

However, the base station 402 may be unable to avoid all conflicts in all scenarios. Therefore, the base station 402 may determine at least one of the sidelink communication patterns 426a, 426b based on a conflict resolution scheme. The conflict resolution scheme may consider one or both schedules of the pair of the UEs 404a, 404b, 404c associated with the respective one of the sidelink communication patterns 426a, 426b, one or more schedules of other ones of the UEs 404a, 404b, 404c unassociated with the base station 402, and/or other information indicated by one or more of the sidelink request 424a, 424b, 424c, In some aspects, the base station 402 may further determine a respective sidelink communication pattern 426a, 426b based on schedules of another pair of UEs. For example, the base station 402 may determine a first sidelink communication pattern 426a for the pair of the first UE 404a and the second UE 404b based on the schedule of the third UE 404c, which may also be paired with the first UE 404a in another UE pair.

In some further aspects, the base station 402 may determine a respective sidelink communication pattern 426a, 426b further based on additional information included in at least one of the requests 424a, 424b, 424c. For example, the base station 402 may determine a sidelink communication pattern 426a based on a QoS and/or based on priority information included in at least one of the requests 424a, 424b, 424c.

In still other aspects, the base station 402 may determine one of the sidelink communication patterns 426a, 426b based on information from one of the UEs 404a, 404b, 404c that is unassociated with the one of the sidelink communication patterns 426a, 426b. For example, the base station 402 may determine a first sidelink communication pattern 426a based on a schedule associated with the third UE 404c. In another example, the base station 402 may determine a first sidelink communication pattern 426a based on QoS and/or priority information received in the third sidelink request 424c (e.g., the base station 402 may prioritize a transmission time for the third UE 404c based on information in the third sidelink request 424c indicating a relatively higher priority and/or QoS than that indicated in the other sidelink requests 424a, 424b).

Once determined, the base station 402 may send the first sidelink communication pattern 426a to the corresponding pair of the first UE 404a and the second UE 404b and, further, send the second sidelink communication pattern 426b to the corresponding pair of the first UE 404a and the third UE 404c. The second UE 404b may receive the first sidelink communication pattern 426a, the third UE 404c may receive the second sidelink communication pattern 426b, and the first UE 404a may receive both the first sidelink communication pattern 426a and the second sidelink communication pattern 426b.

One or more of the sidelink communication patterns 426a, 426b may be associated with a slow time scale. This slow time scale may be a duration for which at least one of the sidelink communication patterns 426a, 426b is valid. By way of example, the slow time scale may be at least approximately 100 ms. When a slow time scale corresponding to one of the patterns 426a, 426b has elapsed, the pair of the UEs 404a, 404b, 404c to which the sidelink communication pattern 426s is applicable may be re-determined, such as by again sending sidelink communications requests (e.g., similar to the requests 424a, 424b, 424c) from the pair of the UEs 404a, 404b, 404c that is engaged in sidelink communication.

Based on the corresponding one of the sidelink communication patterns 426a, 426b, the pair of the first UE 404a and the second UE 404b may communicate and the pair of the first UE 404a and the third UE 404c may communicate. Each sidelink communication pattern 426a, 426b may indicate configure each UE pair so that one of the UEs 404a, 404b, 404c of the UE pair is to transmit and another of the UEs 404a, 404b, 404c of the UE pair is to receive during a set of slots.

Illustratively, the base station 402 may determine the first sidelink communication pattern 426a to configure the second UE 404b to transmit on the sidelink control channel 410a in slots 1, 4, and 7. Similarly, the base station 402 may determine the second sidelink communication pattern 426b to configure the first UE 404a to transmit on the sidelink control channel 410a in slots 3, 6, and 9.

When configured to communicate in a slot according to one of the sidelink communication patterns 426a, 426b, the UEs 404a, 404b, 404c may be configured to determine a beam of the beams 406a, 406b, 406c based on the corresponding one of the sidelink communication patterns 426a, 426b. For example, the second UE 404b may select a TX beam of the beams 406b for transmitting to the first UE 404a on the sidelink control channel 410a in the first slot based first sidelink communication pattern 426a.

The determination of a beam may be further based on beam training during the discovery phase. For example, the first UE 404a may determine an RX beam of the beams 406a that corresponds to the selected TX beam of the beams 406b via which the second UE 404b may transmit on the sidelink data channel 410b.

In the aspects illustrated by FIG. 4, the second UE 404b may have first data 430 to send to the first UE 404a, and the first UE 404a may have second data 434 to send to the third UE 404c. In order to send data on the sidelink, the first UE 404a and the second UE 404b may determine respective control information 428, 432 associated with the sidelink data channel 410b.

The control information 428, 432 may enable the first UE 404a and the third UE 404c, respectively, to successfully detect and decode the data on the sidelink data channel 410b from the second UE 404b and the first UE 404a. For example, the control information 428, 432 may indicate at least one of a schedule for receiving data on the sidelink data channel 410b, an MCS for communication on the sidelink data channel 410b, information associated with a HARQ process for the sidelink data channel 410b, a set of resources allocated on the sidelink data channel 410b to carry the data, and/or a TCI state associated with the sidelink data channel 410b. A TCI state may indicate an index associated with a beam of the beams 406a, 406b via which a respective one of the first UE 404a or the second UE 404b may transmit, such as an active beam of the beams 406a of the first UE 404a identified during beam training with the third UE 404c or an active beam of the beams 406b of the second UE 404b identified during beam training with the first UE 404a.

During one or more slots configured for transmission by the second UE 404b, the second UE 404b may send the first control information 428 to the first UE 404a on the sidelink control channel 410a. The first UE 404a may be monitoring a set of resources allocated for the sidelink control channel 410a based on the first sidelink communication pattern 426a. In so doing, the first UE 404a may use an RX beam of the beams 406a for reception from the second UE 404b.

Similarly, during the set of slots configured for transmission by the first UE 404a according to the second sidelink communication pattern 426b, the first UE 404a may send the second control information 432 to the third UE 404c on the sidelink control channel 410a. The third UE 404c may be monitoring a set of resources allocated for the sidelink control channel 410a based on the second sidelink communication pattern 426b. In so doing, the third UE 404c may use an RX beam of the beams 406c for reception from the first UE 404a.

Thus, based on the first sidelink communication pattern 426a, the first UE 404a may successfully detect and decode the first control information 428. The first UE 404a may obtain various parameters from the first control information 428 for sidelink communication on the sidelink data channel 410b, such as a schedule for receiving the first data 430 on the sidelink data channel 410b.

Subsequently, the second UE 404b may directly send first data 430 on the sidelink data channel 410b to the first UE 404a. The second UE 404b may send the first data 430 on the sidelink data channel 410b based on the first control information 428. For example, the second UE 404b may send the first data 430 on the sidelink data channel 410b according to a schedule indicated in the first control information 428.

Based on the first control information 428, the first UE 404a may successfully receive and decode the data 430 on the sidelink data channel 410b. For example, the first UE 404a may select an RX beam of the beams 406a, and use the selected RX beam for reception on the sidelink data channel 410b on resources of the sidelink data channel 410b indicated in the first control information 428.

In a set of slots configured according to the second sidelink communication pattern 426b, the third UE 404c may successfully detect and decode the second control information 432 on the sidelink control channel 410a. The third UE 404c may obtain various parameters from the second control information 432 for sidelink communication on the sidelink data channel 410b, such as a schedule for receiving the second data 434 on the sidelink data channel 410b.

Subsequently, the first UE 404a may directly send second data 434 on the sidelink data channel 410b to the third UE 404c. The first UE 404a may send the second data 434 on the sidelink data channel 410b based on the second control information 432. For example, the first UE 404a may send the second data 434 on the sidelink data channel 410b according to a schedule indicated in the second control information 432.

Based on the second control information 432, the third UE 404c may successfully receive and decode the data 434 on the sidelink data channel 410b. For example, the third UE 404c may select an RX beam of the beams 406c, and use the selected RX beam for reception on the sidelink data channel 410b on resources of the sidelink data channel 410b indicated in the second control information 432.

Figure 5:
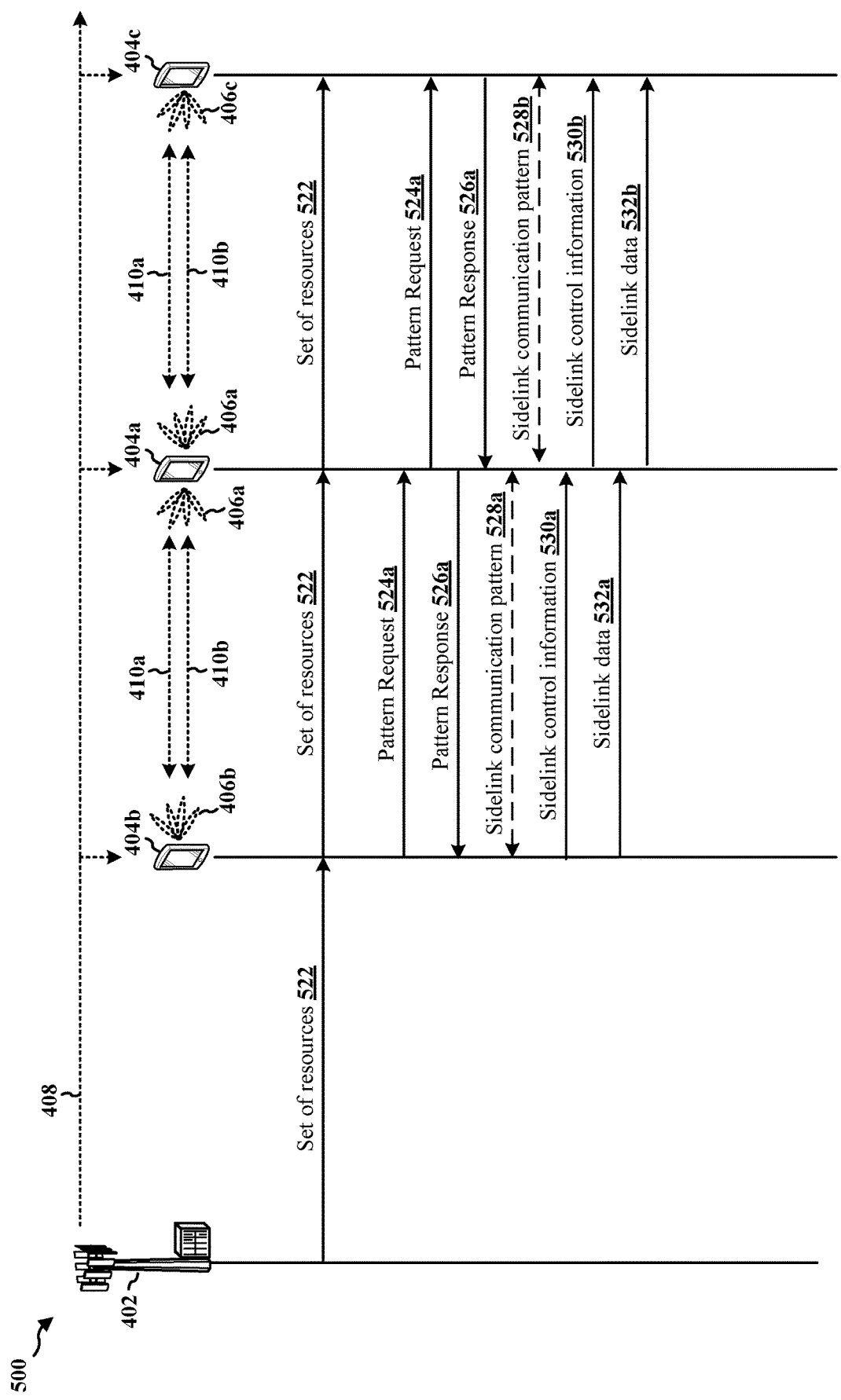
FIG. 5 is a diagram illustrating a call flow between a set of UEs and a base station for wireless sidelink communication between pairs of UEs.

FIG. 5 is a diagram illustrating a call flow 500 for a distributed configuration of a sidelink communication pattern. According to the call flow 500, a base station 402 may refrain from configuring sidelink communication between UE pairs, a first of which may include a first UE 404a and a second UE 404b and a second of which may include the first UE 404a and a third UE 404c.

As described with respect to FIG. 4, supra, sidelink communication in a cell provided by the base station 402 may overlap with access link communication in the cell and, therefore, the base station 402 may allocate a set of resources 522 for sidelink communication in the cell. By allocating the set of resources 522 for sidelink communication, the base station 402 may reduce or prevent conflicts, interference, and the link on resources in the cell. The set of resources 522 may include a set of PRBs and/or time/frequency resources.

In one aspect, the base station 402 may semi-statically allocate the set of resources 522 for sidelink communication. In another aspect, the base station 402 may adaptively allocate the set of resources 522 for sidelink communication. The base station 402 may adaptively allocate the set of resources 522 for sidelink communication on a slow time scale. The slow time scale may indicate the duration for which the resource allocation for sidelink communication is valid. For example, the base station 402 may allocate every even-numbered slot for sidelink communication for the next 5 minutes, and 5 minutes may be the slow time scale. The slow time scale may be of a duration that is at least approximately 100 milliseconds (ms); although the slow time scale may be appreciably greater than 100 ms, such as 30 seconds, 10 minutes, etc.

The base station 402 may indicate the allocated set of resources 522 via broadcast. Thus, the downlink broadcast channel 408 may carry information indicating the allocated set of resources 522. According one example, the downlink broadcast channel 408 may include a PBCH.

Each of the UEs 404a, 404b, 404c may receive the information indicating the allocated set of resources 522 when within the cell provided by the base station 402. In some aspects, one of the UEs 404a, 404b, 404c may receive the information indicating the allocated set of resources 522 regardless of whether that one of the UEs 404a, 404b, 404c is operating on a cell provided by the base station 402. For example, the first UE 404a may receive the information indicating the allocated set of resources 522 even though the first UE 404a may not have acquired timing synchronization with the base station, as the information indicating the allocated set of resources 522 is broadcast and therefore may not be scrambled with cell-specific and/or UE-specific information.

In the illustrated aspect, the first UE 404a may establish a first UE pair with the second UE 404b and may establish a second UE pair with the third UE 404c based on the discovery phase. While the first pair of UEs 404a, 404b and the second pair of UEs 404a, 404c may be established and the set of resources 522 for sidelink communication may be allocated, the sidelink communication for the first pair of UEs 404a, 404b and the second pair of UEs 404a, 404c may be unscheduled.

In order to schedule sidelink communication between the first pair of UEs 404a, 404b and the second pair of UEs 404a, 404c, a respective sidelink communication pattern may be configured for each of the first pair of UEs 404a, 404b and the second pair of UEs 404a, 404c. A sidelink communication pattern may schedule which UE of a UE pair is to act as a transmitter and which UE of that UE pair is to act as a receiver, e.g., in a slot of the allocated set of resources 522.

In scheduling one UE of a UE pair as the transmitter and another UE of the UE pair as the receiver, each UE of the UE pair may identify a beam via which to transmit or receive. Thus, each UE of the UE pair may determine a beam associated with communicating with the other UE of the UE pair based on the sidelink communication pattern.

In contrast to FIG. 4, aspects of FIG. 5 illustrate distributed configurations of sidelink communication patterns. With such distributed configurations, the UEs 404a, 404b, 404c may refrain from informing the base station 402 of the UE pairs determined between the first UE 404a and the second UE 404b and between the first UE 404a and the third UE 404c.

Each of the pairs of the UEs 404a, 404b, 404c may negotiate a respective sidelink communication pattern 528a, 528b. The pairs of the UEs 404a, 404b, 404c may negotiate a respective sidelink communication pattern 528a, 528b on the set of resources 522 allocated by the base station 402.

To negotiate a respective one of the sidelink communication patterns 528a, 528b, one of the UEs 404a, 404b, 404c of one UE pair may send a respective pattern request 524a, 524b on the sidelink control channel 410a. Based on the respective pattern request 524a, 524b, the other one of the UEs 404a, 404b, 404c of the one UE pair may send a respective pattern response 526a, 526b on the sidelink control channel 410a. While the pattern requests 524a, 524b and the pattern responses 526a, 526b may be sent on the same sidelink control channel 410a (according to the allocated set of resources), each pattern request 524a, 524b may be sent in a respective set of slots that does not overlap with a respective set of slots in which each pattern response 526a, 526b is sent.

Each pattern response 526a, 526b may indicate at least one of a confirmation of a corresponding pattern request 524a, 524b or a new pattern request proposing a new sidelink communication pattern different from that proposed in the initial corresponding pattern response 526a, 526b. This pattern request/response exchange may continue through one or more iterations until one of the UEs 404a, 404b, 404c confirms a request for a sidelink communication pattern, and a corresponding one of the sidelink communication patterns 528a, 528b is established.

Illustratively, the second UE 404b may send, to the first UE 404a, the first pattern request 524a, which may indicate a proposal for the sidelink communication pattern 528a. The second UE 404b may determine the first pattern request 524a based on a schedule of the second UE 404b and/or based on other information associated with the second UE 404b (e.g., a QoS for the sidelink communication with the first UE 404a, a relative priority of the sidelink communication with the first UE 404a, etc.). For example, the second UE 404b may propose to transmit during a set of slots in which the second UE 404b is neither scheduled to transmit (e.g., uplink communication with the base station 402) nor scheduled to receive (e.g., downlink communication with the base station 402).

To receive the first pattern request 524a, the first UE 404a may select an RX beam of the beams 406a, which may be selected based on the discovery phase with the second UE 404b. The first UE 404a may use the selected RX beam during a set of slots on the sidelink control channel 410a, which may correspond to the allocated set of resources 522.

The first UE 404a may successfully detect and decode the first pattern request 524a and, based on the first pattern request 524a, the first UE 404a may determine whether to confirm the first pattern request 524a or to propose a different sidelink communication pattern. The first UE 404a may determine whether to confirm the first pattern request 524a based on a schedule of the first UE 404a and/or based on other information associated with the first UE 404a (e.g., a QoS for the sidelink communication with the second UE 404b, a relative priority of the sidelink communication with the second UE 404b, etc.).

In determining whether to confirm the first pattern request 524a, the first UE 404a may implement a conflict avoidance algorithm. In so doing, the first UE 404a may prevent confirmation of a sidelink communication pattern that schedules the first UE 404a for transmission and/or reception during a time (e.g., during a slot and/or symbol) which the first UE 404a is already scheduled for transmission (e.g., uplink communication with the base station 402) or reception (e.g., downlink communication with the base station 402).

If the first UE 404a determines to confirm the first pattern request 524a, the first UE 404a may send a first pattern response 526a that confirms the sidelink communication pattern proposed by the second UE 404b, and the first sidelink communication pattern 528a may be confirmed. If the first UE 404a determines not to confirm the first pattern request 524a, the first UE 404a may propose a new sidelink communication pattern different from that proposed in the first pattern request 524a.

The first UE 404a may then send the first pattern response 526a to the second UE 404b in order to indicate the determined one of the confirmation or the newly proposed sidelink communication pattern. The first UE 404 may sent the first pattern response 526a in a different set of slots than that in which the first pattern request 524a is received. In the different set of slots, the second UE 404b may select an RX beam of the beams 406b (e.g., based on the discovery phase with the first UE 404a) and use the selected RX beam of the beams 406b for reception on the sidelink control channel 410a from the first UE 404a.

The second UE 404b may successfully detect and decode the first pattern response 526a. When the first pattern response 526a indicates a confirmation of the first pattern request 524a, the first and second UEs 404a, 404b may agree upon the first sidelink communication pattern 528a. Otherwise, similar to determination of whether to confirm the first pattern request 524a by the first UE 404a, the second UE 404b may determine whether to confirm the sidelink communication pattern proposed by the first UE 404a in the first pattern response 526a. The first and second UEs 404a, 404b may iteratively repeat this exchange of requests/responses until the first sidelink communication pattern 528a is agreed upon.

Other UE pairs may perform a similar iterative exchange of requests and responses in order to determine a respective sidelink communication pattern. For example, the first UE 404a may send a second pattern request 524a to the third UE 404c proposing a sidelink communication pattern. The third UE 404c may either confirm the proposed sidelink communication pattern or propose a new sidelink communication pattern, and indicate the confirmation or new proposal in the second pattern response 526b. Accordingly, the first and third UEs 404a, 404c may determine the second sidelink communication pattern 528b for the pair of the first and third UEs 404a, 404c.

One or more of the sidelink communication patterns 528a, 528b may be associated with a slow time scale. This slow time scale may be a duration for which at least one of the sidelink communication patterns 528a, 528b is valid. By way of example, the slow time scale may be at least approximately 100 ms. When a slow time scale corresponding to one of the patterns 528a, 528b has elapsed, the pair of the UEs 404a, 404b, 404c to which the one of the sidelink communication pattern 426a, 426b is applicable may be re-determined, such as by again negotiating a sidelink communication pattern (e.g., similar to the iterative exchange of the requests 524a, 524b and responses 526a, 526b) between the pair of the UEs 404a, 404b, 404c that is engaged in sidelink communication.

Based on the corresponding one of the sidelink communication patterns 528a, 528b, the pair of the first UE 404a and the second UE 404b may communicate and the pair of the first UE 404a and the third UE 404c may communicate. Each sidelink communication pattern 528a, 528b may indicate configure a UE pair so that one of the UEs 404a, 404b, 404c is to transmit and another of the UEs 404a, 404b, 404c is to receive during a set of slots.

Illustratively, the first sidelink communication pattern 528a may be negotiated between the first and second UEs 404a, 404b so that the second UE 404b is to transmit and the first UE 404a is to receive on the sidelink control channel 410a in slots 1, 4, and 7. Similarly, the second sidelink communication pattern 528b may be negotiated between the first and third UEs 404a, 404c so that the first UE 404a is to transmit and the third UE 404c is to receive on the sidelink control channel 410a in slots 3, 6, and 9. Thus, the first UE 404a is configured according to the sidelink communication patterns 528a, 528b for transmitting to the third UE 404c in a set of slots that does not overlap with the set of slots in which the first UE 404a is scheduled to receive from the second UE 404b.

When configured to communicate in a slot according to one of the sidelink communication patterns 528a, 528b, the UEs 404a, 404b, 404c may be configured to determine a beam of the beams 406a, 406b, 406c based on the corresponding one of the sidelink communication patterns 528a, 528b. For example, the second UE 404b may select a TX beam of the beams 406b for transmitting to the first UE 404a on the sidelink control channel 410a in a first set of slots based on the first sidelink communication pattern 528a.

The determination of a beam may be further based on beam training during the discovery phase. For example, the first UE 404a may determine an RX beam of the beams 406a that corresponds to the selected TX beam of the beams 406b via which the second UE 404b may transmit on the sidelink data channel 410b in the first set of slots based on the first sidelink communication pattern 528a.

In the aspects illustrated by FIG. 4, the second UE 404b may have first data 532a to send to the first UE 404a, and the first UE 404a may have second data 532b to send to the third UE 404c. In order to send data on the sidelink, the first UE 404a and the second UE 404b may determine respective control information 530a, 530b associated with the sidelink data channel 410b.

The control information 530a, 530b may enable the first UE 404a and the third UE 404c, respectively, to successfully detect and decode the data on the sidelink data channel 410b from the second UE 404b and the first UE 404a. For example, the control information 530a, 530b may indicate at least one of a schedule for receiving data on the sidelink data channel 410b, an MCS for communication on the sidelink data channel 410b, information associated with a HARQ process for the sidelink data channel 410b, a set of resources allocated on the sidelink data channel 410b to carry the data, and/or a TCI state associated with the sidelink data channel 410b. A TCI state may indicate an index associated with a beam of the beams 406a, 406b via which a respective one of the first UE 404a or the second UE 404b may transmit, such as an active beam of the beams 406a of the first UE 404a identified during beam training with the third UE 404c or an active beam of the beams 406b of the second UE 404b identified during beam training with the first UE 404a.

During one or more slots configured for transmission by the second UE 404b, the second UE 404b may send the first control information 530a to the first UE 404a on the sidelink control channel 410a. The first UE 404a may be monitoring a set of resources allocated for the sidelink control channel 410a based on the first sidelink communication pattern 528a. In so doing, the first UE 404a may use an RX beam of the beams 406a for reception from the second UE 404b.

Similarly, during the set of slots configured for transmission by the first UE 404a according to the second sidelink communication pattern 528b, the first UE 404a may send the second control information 530b to the third UE 404c on the sidelink control channel 410a. The third UE 404c may be monitoring a set of resources allocated for the sidelink control channel 410a based on the second sidelink communication pattern 528b. In so doing, the third UE 404c may use an RX beam of the beams 406c for reception from the first UE 404a.

Thus, based on the first sidelink communication pattern 528a, the first UE 404a may successfully detect and decode the first control information 530a. The first UE 404a may obtain various parameters from the first control information 530a for sidelink communication on the sidelink data channel 410b, such as a schedule for receiving the first data 532a on the sidelink data channel 410b.

Subsequently, the second UE 404b may directly send first data 532a on the sidelink data channel 410b to the first UE 404a. The second UE 404b may send the first data 532a on the sidelink data channel 410b based on the first control information 530a. For example, the second UE 404b may send the first data 532a on the sidelink data channel 410b according to a schedule indicated in the first control information 530a.

Based on the first control information 530a, the first UE 404a may successfully receive and decode the first data 532a on the sidelink data channel 410b. For example, the first UE 404a may select an RX beam of the beams 406a, and use the selected RX beam for reception on the sidelink data channel 410b on resources of the sidelink data channel 410b indicated in the first control information 530a.

In a set of slots configured according to the second sidelink communication pattern 528b, the third UE 404c may successfully detect and decode the second control information 530b on the sidelink control channel 410a. The third UE 404c may obtain various parameters from the second control information 530a for sidelink communication on the sidelink data channel 410b, such as a schedule for receiving the second data 532b on the sidelink data channel 410b.

Subsequently, the first UE 404a may directly send second data 532b on the sidelink data channel 410b to the third UE 404c. The first UE 404a may send the second data 532b on the sidelink data channel 410b based on the second control information 530b. For example, the first UE 404a may send the second data 532b on the sidelink data channel 410b according to a schedule indicated in the second control information 530a.

Based on the second control information 530b, the third UE 404c may successfully receive and decode the second data 532b on the sidelink data channel 410b. For example, the third UE 404c may select an RX beam of the beams 406c, and use the selected RX beam for reception on the sidelink data channel 410b on resources of the sidelink data channel 410b indicated in the second control information 530b.

Figure 6:
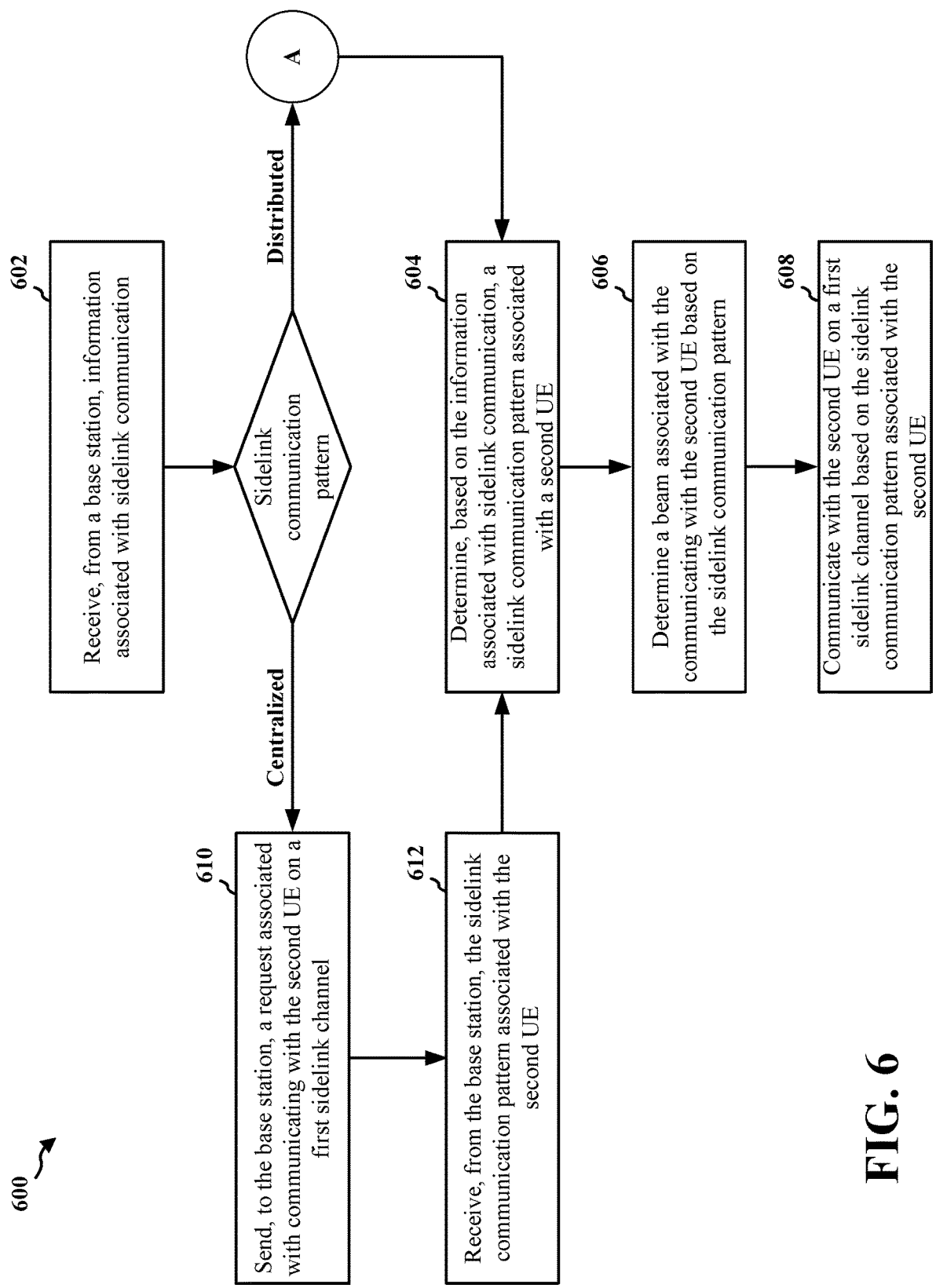
FIG. 6 is a flowchart of a method of wireless sidelink communication by a UE.

FIG. 6 is a flowchart of a method 600 of wireless communication. The method 600 may be performed by a first UE (e.g., the UE 104, 350, 404a, 404b, 404c; the apparatus 1002/1002'; the processing system 1114, which may include the memory 360 and which may be the entire UE 104, 350, 404a, 404b, 404c or a component of the UE 104, 350, 404a, 404b, 404c, such as the TX processor 368, the RX processor 356, and/or the controller/processor 359). In different aspects, one or more of the illustrated operations may be transposed, omitted, and/or contemporaneously performed.

At 602, the first UE may receive, from a base station, information associated with sidelink communication. In one aspect, the information associated with sidelink communication may indicate a resource allocation associated with sidelink communication. In some aspects, resource allocation may include a set of resources allocated in a semi-static manner. In some other aspects, the resource allocation may be associated with a slow time scale, such as at least 100 ms. In still further aspects, the information associated with sidelink communication does not schedule any UEs on the resource allocation associated with sidelink communication. For example, referring to FIG. 4, at least one of the UEs 404a, 404b, 404c, may receive, from the base station 402, the information indicating the set of resources 422 allocated in association with sidelink communication. Referring to FIG. 5, at least one of the UEs 404a, 404b, 404c, may receive, from the base station 402, the information indicating the set of resources 522 allocated in association with sidelink communication.

If the sidelink communication pattern is configured in a centralized manner, then at 610, the first UE may send, to the base station, a request associated with communicating with a second UE on a first sidelink channel. The request may indicate an ID of the second UE. In some aspects, the request may indicate a QoS and/or priority information associated with sidelink communication with the second UE. For example, referring to FIG. 5, at least one of the UEs 404a, 404b, 404c may send, to the base station 402, a respective one of the sidelink requests 424a, 424b, 424c associated with communicating with another one of the UEs 404a, 404b, 404c on the sidelink control channel 410a.

At 612, the first UE may receive, from the base station, a sidelink communication pattern associated with the second UE. In some aspects, the sidelink communication pattern may be associated with a slow time scale, such as at least 100 ms. For example, referring to FIG. 5, at least one of the UEs 404a, 404b, 404c may receive, from the base station 402, a respective one of the sidelink communication patterns 426a, 426b associated with communicating with another one of the UEs 404a, 404b, 404c.

Figure 7:
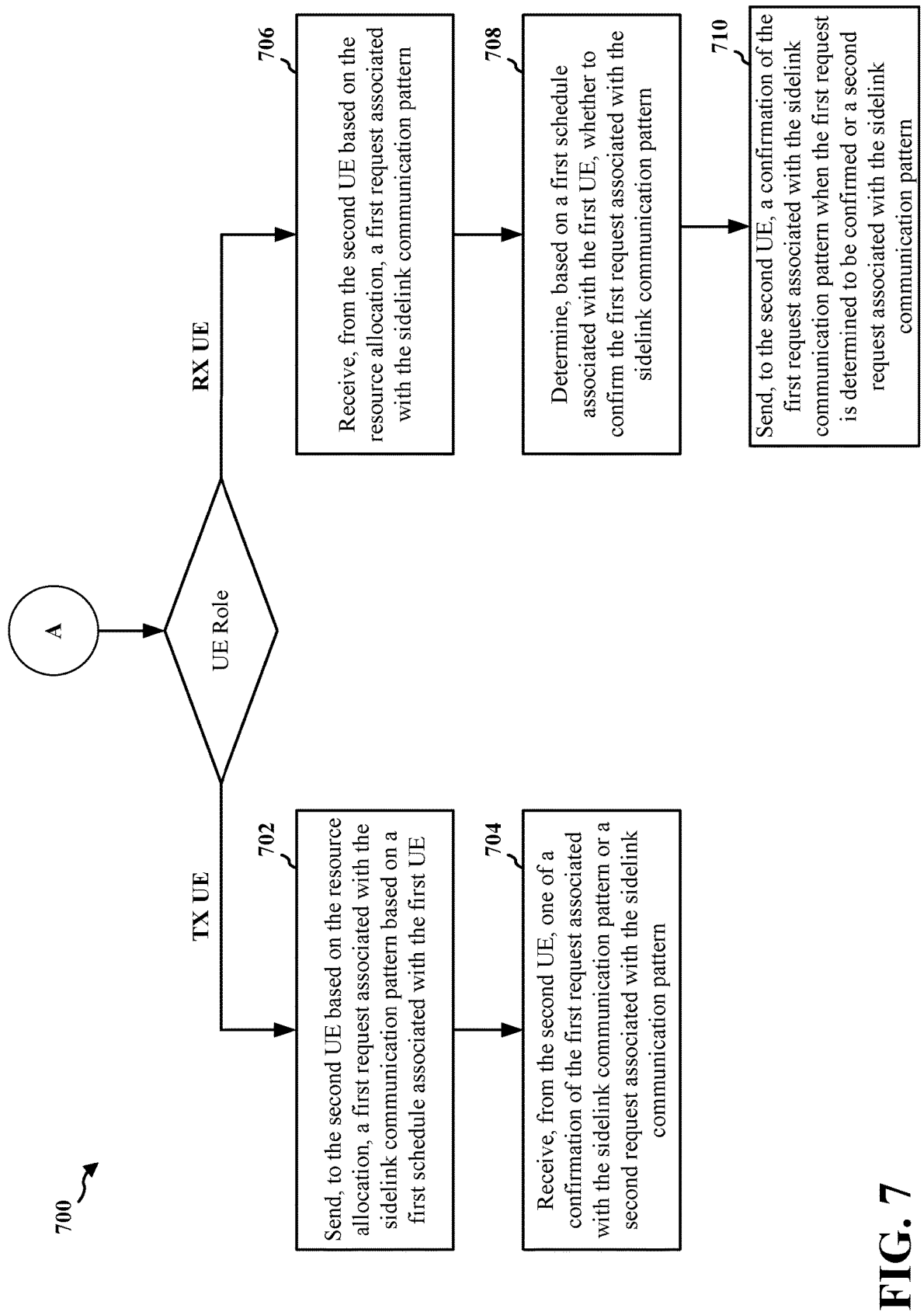
FIG. 7 is a flowchart of a method of wireless sidelink communication by a UE.

Alternatively, if the sidelink communication pattern is configured in a distributed manner, then the method 600 may proceed to the method 700 of FIG. 7. Following the centralized or distributed configuration of the sidelink communication pattern, then at 604, the first UE may determine based on the information associated with sidelink communication, the sidelink communication pattern associated with the second UE. For example, referring to FIG. 4, at least one of the UEs 404a, 404b, 404c, may determine a corresponding one of the sidelink communication patterns 426a, 426b associated with another one of the UEs 404a, 404b, 404c. Referring to FIG. 5, at least one of the UEs 404a, 404b, 404c, may determine a corresponding one of the sidelink communication patterns 528a, 528b associated with another one of the UEs 404a, 404b, 404c.

At 606, the first UE may determine a beam associated with communicating with the second UE based on the sidelink communication pattern. For example, referring to FIG. 4, at least one of the UEs 404a, 404b, 404c, may determine one beam of a respective one of the beams 406a, 406b, 406c, associated communicating with another one of the UEs 404a, 404b, 404c based on a corresponding one of the sidelink communication patterns 426a, 426b. Referring to FIG. 5, at least one of the UEs 404a, 404b, 404c, may determine one beam of a respective one of the beams 406a, 406b, 406c, associated communicating with another one of the UEs 404a, 404b, 404c based on a corresponding one of the sidelink communication patterns 528a, 528b.

At 608, the first UE may communicate with the second UE on a first sidelink channel based on the first sidelink communication pattern associated with the second UE. For example, referring to FIG. 4, at least one of the UEs 404a, 404b, 404c, may communicate with another one of the UEs 404a, 404b, 404c based on a corresponding one of the sidelink communication patterns 426a, 426b. Referring to FIG. 5, at least one of the UEs 404a, 404b, 404c, may communicate with another one of the UEs 404a, 404b, 404c based on a corresponding one of the sidelink communication patterns 528a, 528b.

FIG. 7 is a flowchart of a method 700 of wireless communication. The method 600 may be performed by a first UE (e.g., the UE 104, 350, 404a, 404b, 404c; the apparatus 1002/1002'; the processing system 1114, which may include the memory 360 and which may be the entire UE 104, 350, 404a, 404b, 404c or a component of the UE 104, 350, 404a, 404b, 404c, such as the TX processor 368, the RX processor 356, and/or the controller/processor 359). In different aspects, one or more of the illustrated operations may be transposed, omitted, and/or contemporaneously performed.

The method 700 may be associated with a distributed configuration of a sidelink communication pattern. For a distributed configuration, a TX UE may initiate negotiation of the sidelink communication pattern, and the other UE may be an RX UE.

When the first UE is a TX UE, at 702, the UE may send, to the second UE based on the resource allocation, a first request associated with the sidelink communication pattern based on a first schedule associated with the first UE. For example, referring to FIG. 5, at least one of the UEs 404a, 404b, 404c, may send, to another one of the UEs 404a, 404b, 404c and based on the allocated set of resources 522, a respective one of the pattern requests 524a, 524b, associated with a corresponding one of the sidelink communication patterns 528a, 528b based on a first schedule of the at least one of the UEs 404a, 404b, 404c.

At 704, the first UE may receive, from the second UE, one of a confirmation of the first request associated with the sidelink communication pattern or a second request associated with the sidelink communication pattern. For example, referring to FIG. 5, at least one of the UEs 404a, 404b, 404c, may receive, from another one of the UEs 404a, 404b, 404c, a respective one of the pattern responses 526a, 526b, associated with a corresponding one of the sidelink communication patterns 528a, 528b.

When the first UE is an RX UE, at 706, the UE may receive, from the second UE based on the resource allocation, a first request associated with the sidelink communication pattern. For example, referring to FIG. 5, at least one of the UEs 404a, 404b, 404c, may receive, from another one of the UEs 404a, 404b, 404c and based on the allocated set of resources 522, a respective one of the pattern requests 524a, 524b, associated with a corresponding one of the sidelink communication patterns 528a, 528b.

At 708, the first UE may determine, based on a first schedule associated with the first UE, whether to confirm the first request associated with the sidelink communication pattern. For example, referring to FIG. 5, at least one of the UEs 404a, 404b, 404c, may determine, based on a first schedule associated with the at least one of the UEs 404a, 404b, 404c, whether to confirm a respective one of the pattern requests 524a, 524b, associated with a corresponding one of the sidelink communication patterns 528a, 528b.

At 710, the first UE may send, to the second UE, a confirmation of the first request associated with the sidelink communication pattern when the first request is determined to be confirmed or a second request associated with the sidelink communication pattern. For example, referring to FIG. 5, at least one of the UEs 404a, 404b, 404c, may send, to another one of the UEs 404a, 404b, 404c, a respective one of the pattern responses 526a, 526b, associated with a corresponding one of the sidelink communication patterns 528a, 528b.

Figure 8:
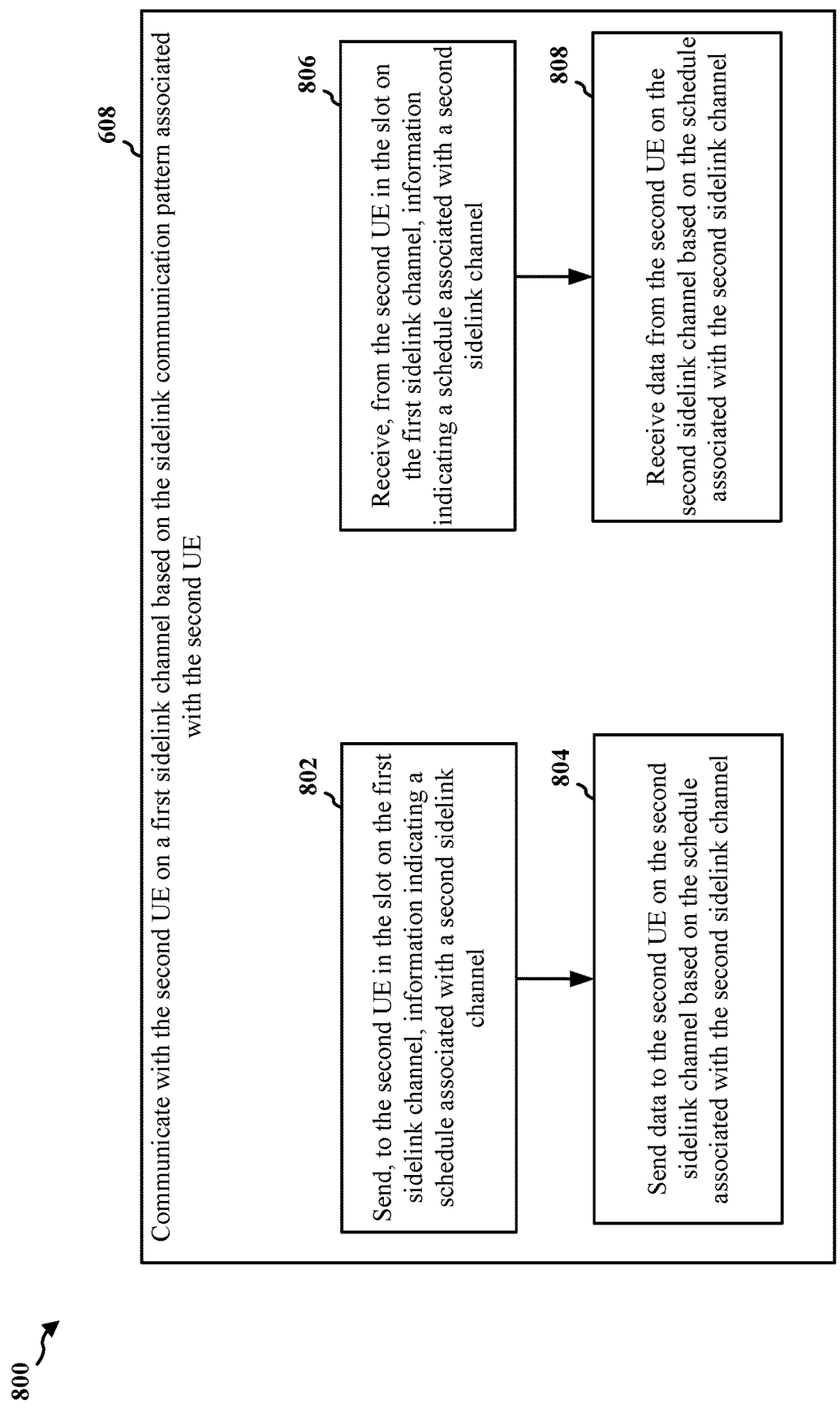
FIG. 8 is a flowchart of a method of wireless sidelink communication by a UE.

FIG. 8 illustrates an aspect 800 of 608 of FIG. 6, in which the first UE may communicate with the second UE on a first sidelink channel based on the sidelink communication pattern associated with the second UE. If the first UE is a TX UE, then at 802, the first UE may send, to the second UE in a slot configured by the sidelink communication pattern, information indicating a schedule associated with a second sidelink channel. For example, referring to FIG. 4, at least one of the UEs 404a, 404b, 404c, may send, to another one of the UEs 404a, 404b, 404c in a slot configured by one of the sidelink communication patterns 426a, 426b on the sidelink control channel 410a, one of the first or second control information 428, 432. Referring to FIG. 5, at least one of the UEs 404a, 404b, 404c, may send, to another one of the UEs 404a, 404b, 404c in a slot configured by one of the sidelink communication patterns 528a, 528b on the sidelink control channel 410a, one of the first or second control information 530a, 530b.

At 804, the first UE may send data to the second UE on the second sidelink channel based on the schedule associated with the second sidelink channel. For example, referring to FIG. 4, at least one of the UEs 404a, 404b, 404c, may send, to another one of the UEs 404a, 404b, 404c, first or second data 430, 434 on the sidelink data channel 410b based on one of the first or second control information 428, 432. Referring to FIG. 5, at least one of the UEs 404a, 404b, 404c, may send, to another one of the UEs 404a, 404b, 404c, first or second data 532a, 532b on the sidelink data channel 410b based on one of the first or second control information 530a, 530b.

If the first UE is an RX UE, then at 806, the first UE may receive, from the second UE in a slot configured by the sidelink communication pattern, information indicating a schedule associated with a second sidelink channel. For example, referring to FIG. 4, at least one of the UEs 404a, 404b, 404c, may receive, from another one of the UEs 404a, 404b, 404c in a slot configured by one of the sidelink communication patterns 426a, 426b on the sidelink control channel 410a, one of the first or second control information 428, 432. Referring to FIG. 5, at least one of the UEs 404a, 404b, 404c, may receive, from another one of the UEs 404a, 404b, 404c in a slot configured by one of the sidelink communication patterns 528a, 528b on the sidelink control channel 410a, one of the first or second control information 530a, 530b.

At 808, the first UE may receive data to the second UE on the second sidelink channel based on the schedule associated with the second sidelink channel. For example, referring to FIG. 4, at least one of the UEs 404a, 404b, 404c, may receive, from another one of the UEs 404a, 404b, 404c, first or second data 430, 434 on the sidelink data channel 410b based on one of the first or second control information 428, 432. Referring to FIG. 5, at least one of the UEs 404a, 404b, 404c, may receive, from another one of the UEs 404a, 404b, 404c, first or second data 532a, 532b on the sidelink data channel 410b based on one of the first or second control information 530a, 530b

Figure 9:
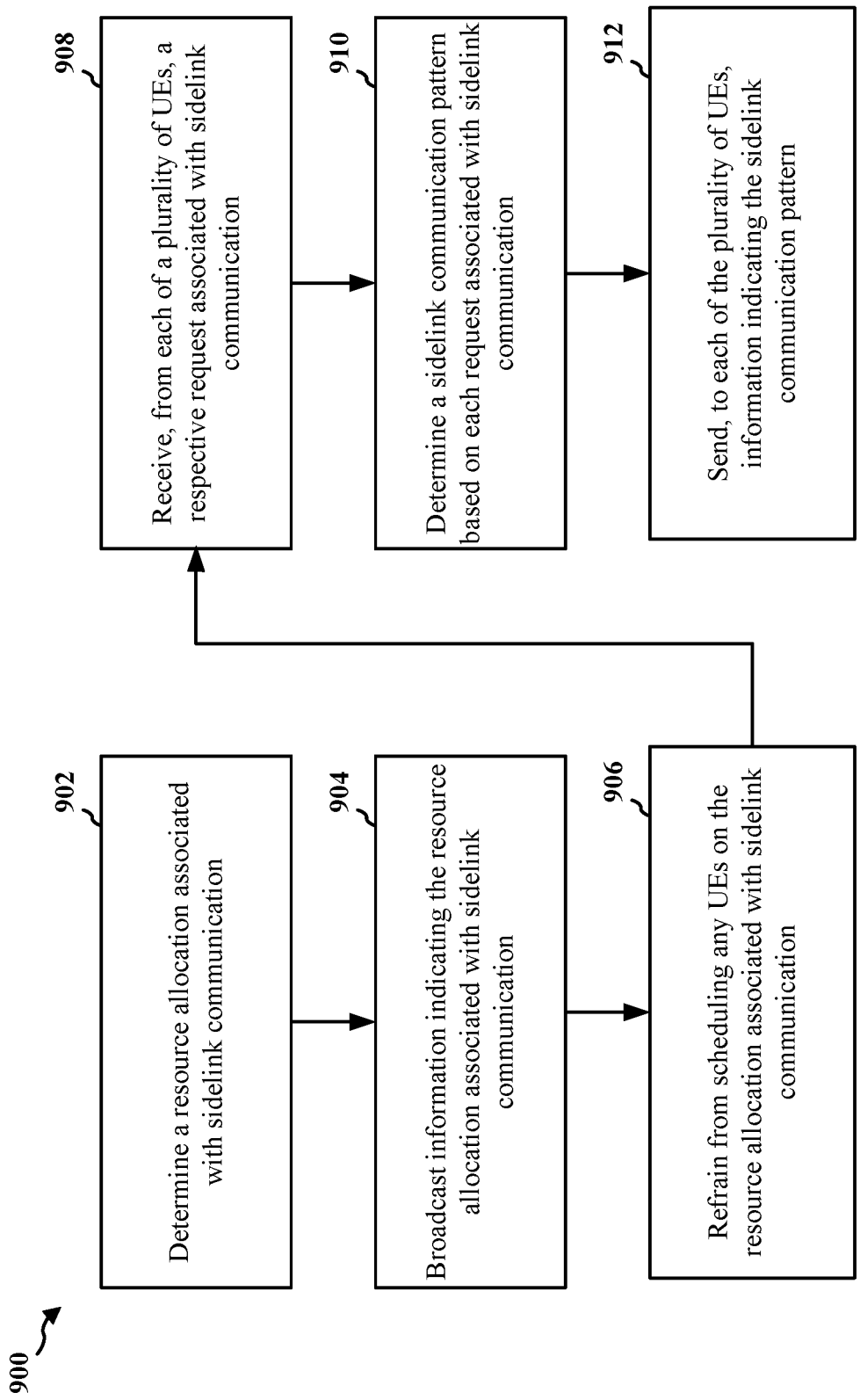
FIG. 9 is a flowchart of a method of assisting wireless sidelink communication between UEs by a base station.

FIG. 9 is a flowchart of a method 900 of wireless communication. The method 900 may be performed by a base station (e.g., the base station 102/180, 310, 402; the apparatus 1202/1202'; the processing system 1314, which may include the memory 376 and which may be the entire base station 102/180, 310, 402 or a component of the base station 102/180, 310, 402, such as the TX processor 316, the RX processor 370, and/or the controller/processor 375). In different aspects, one or more of the illustrated operations may be transposed, omitted, and/or contemporaneously performed.

At 902, the base station may determine a resource allocation associated with sidelink communication. In one aspect, the resource allocation may be semi-statically allocated. In another aspect, the resource allocation may be associated with a slow timescale, which may be at least 100 ms. For example, referring to FIG. 4, the base station 402 may allocate the set of resources 422. Referring to FIG. 5, the base station 402 may determine the set of resources 522 allocated for sidelink communication.

At 904, the base station may broadcast information indicating the resource allocation associated with sidelink communication. For example, referring to FIG. 4, the base station 402 may broadcast the information indicating the set of resources 422 allocated for sidelink communication. Referring to FIG. 5, the base station 402 may broadcast information indicating the set of resources 522 allocated for sidelink communication.

At 906, the base station may refrain from scheduling any UEs on the resource allocation associated with sidelink communication. For example, referring to FIG. 4, the base station 402 may refrain from scheduling any UEs 404a, 404b, 404c on the resource allocation associated with sidelink communication. Referring to FIG. 5, the base station 402 may refrain from scheduling any UEs 404a, 404b, 404c on the set of resources 522 allocated in association with sidelink communication.

At 908, the base station may receive, from each of a plurality of UEs, a respective request associated with sidelink communication. In some aspects, at least one of the respective requests indicates at least one of QoS associated with the sidelink communication or a relative priority associated with the sidelink communication, and a sidelink communication pattern may be determined (910) based on at least one of the QoS or the relative priority. For example, referring to FIG. 4, the base station 402 may receive, from each of the UEs 404a, 404b, 404c, the sidelink requests 424a, 424b, 424c.

At 910, the base station may determine the sidelink communication pattern based on each request associated with the sidelink communication. The sidelink communication pattern may be determined based on at least one of one or more schedules of the plurality of UEs, one or more QoSs indicating in the plurality of requests, and/or one or more relative priorities indicating the plurality of requests. In some aspects, the sidelink communication pattern may be associated with a slow timescale, such as at least 100 ms. For example, referring to FIG. 4, the base station 402 may determine each of the sidelink communication patterns 426a, 426b based on the sidelink requests 424a, 424b, 424c.

At 912, the base station may send, to each of the plurality of UEs, information indicating the sidelink communication pattern. For example, referring to FIG. 4, the base station 402 may send, to the UEs 404a, 404b, 404c, one of the sidelink communication patterns 426a, 426b based on the sidelink requests 424a, 424b, 424c.

Figure 10:
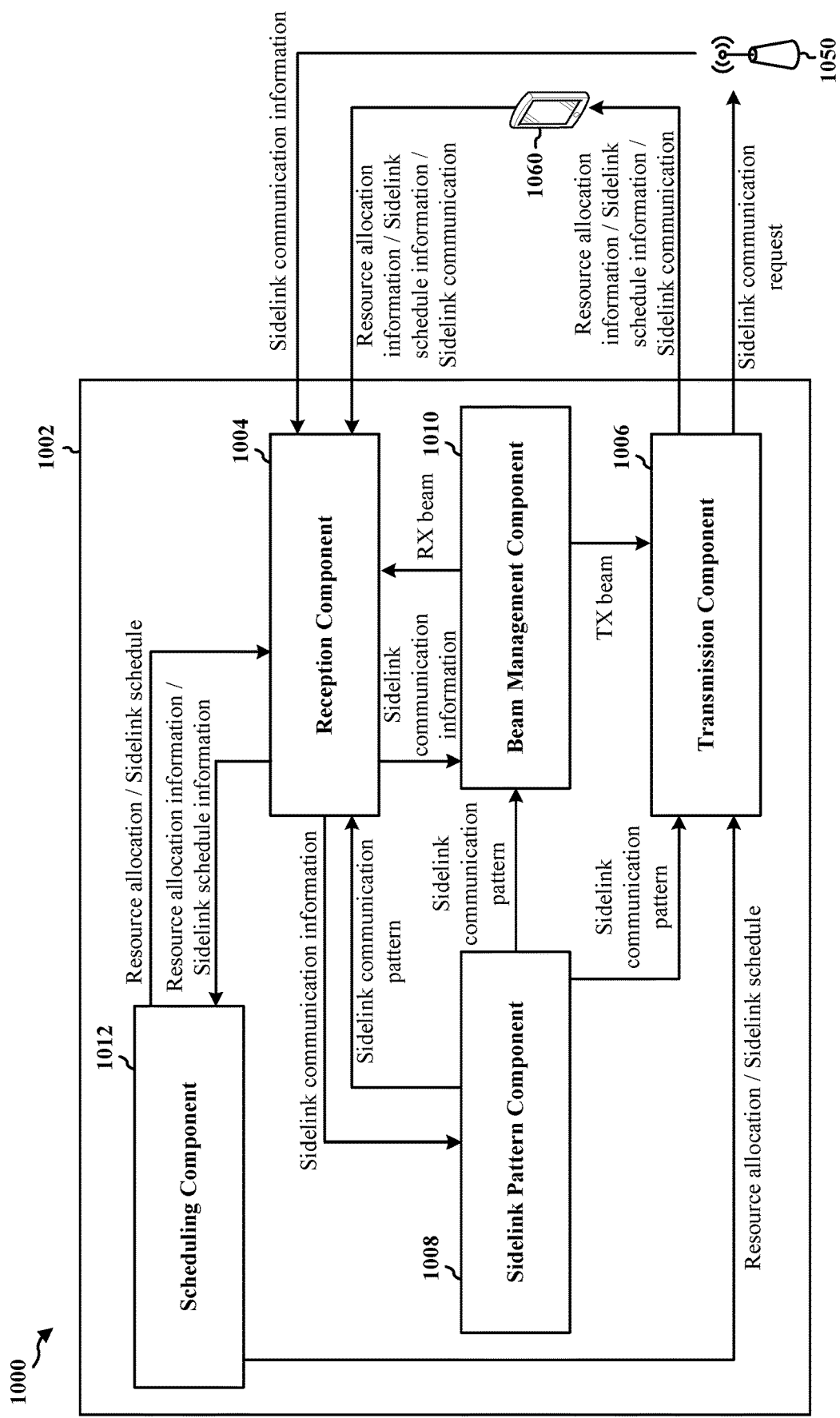
FIG. 10 is a conceptual data flow diagram illustrating the data flow between different means/components in an example apparatus.

FIG. 10 is a conceptual data flow diagram illustrating an example data flow 1000 between different means/components in an example apparatus 1002. The apparatus 1002 may be a UE.

The apparatus 1002 may include a reception component 1004 that receives information associated with sidelink communication from a base station 1050, e.g., as described in connection with 602 of FIG. 6. For example, the information associated with sidelink communication received from the base station 1050 may indicate a resource allocation associated with sidelink communication. The information associated with sidelink communication may not schedule any UEs on the resource allocation associated with sidelink communication.

The apparatus 1002 may further include a sidelink pattern component 1008 that determines a sidelink communication pattern associated with a second UE 1060 based on the received information associated with sidelink communication, e.g., as described in connection with 604 of FIG. 6. In some aspects, the sidelink communication pattern may be associated with a timescale of at least 100 ms.

The apparatus 1002 may further include a transmission component 1006 that may communicate (e.g., transmit data and/or control information) to the second UE 1060 on a first sidelink channel based on the sidelink communication pattern associated with the second UE 1060, e.g., as described in connection with 608 of FIG. 6. In some aspects, the reception component 1004 may additionally or alternatively communicate (e.g., receive data and/or control information) from the second UE 1060 on the first sidelink channel based on the sidelink communication pattern associated with the second UE 1060, e.g., as described in connection with 608 of FIG. 6.

The apparatus 1002 may further include a beam management component 1010 that determines a beam associated with the communication with the second UE 1060 based on the sidelink communication pattern, e.g., as described in connection with 606 of FIG. 6. For example, the beam management component 1010 may determine an RX beam when communication with the second UE 1060 includes reception of data and/or control information from the second UE 1060. The RX beam may be paired with a TX beam of the second UE 1060, e.g., for communication in Frequency Regime (FR) 2. In another example, the beam management component 1010 may determine a TX beam when communication with the second UE 1060 includes transmission of data and/or control information to the second UE 1060. The TX beam may be paired with an RX beam of the second UE 1060, e.g., for communication in FR 2.

In some aspects, the transmission component 1006 may send, to the base station 1050, a request associated with communication with the second UE 1060 on the first sidelink channel, e.g., as described in connection with 610 of FIG. 6. The request associated with communication with the second UE 1060 on the first sidelink channel may indicate at least one of QoS associated with the communication with the second UE 1060 on the first sidelink channel or a relative priority associated with the communication with the second UE 1060 on the first sidelink channel. The reception component 1004 may receive, from the base station 1050 based on the request, information indicating the sidelink communication pattern associated with the second UE 1060, e.g., as described in connection with 612 of FIG. 6. The sidelink pattern component 1008 may then determine the sidelink communication pattern based on the information indicating the sidelink communication pattern associated with the second UE 1060.

The apparatus 1002 may further include a scheduling component 1012 that determines a resource allocation(s) and/or schedule(s) associated with communication with the second UE 1060 on the first sidelink channel and/or on a second sidelink channel. For example, the scheduling component 1012 may determine the resource allocation associated with sidelink communication based on information received from the base station 1050. The resource allocation may be semi-statically allocated by the base station 1050. The resource allocation may be associated with a timescale of at least 100 ms.

In some aspects, the transmission component 1006 may send, to the second UE 1060 based on the resource allocation, a first request associated with the sidelink communication pattern based on a first schedule associated with the apparatus 1002, e.g., as described in connection with 702 of FIG. 7. The reception component 1004 may receive, from the second UE 1060, one of a confirmation of the first request associated with the sidelink communication pattern or a second request associated with the sidelink communication pattern, e.g., as described in connection with 704 of FIG. 7. The sidelink pattern component 1008 may determine the sidelink communication pattern based on the first request or the second request.

In some other aspects, the reception component 1004 may receive, from the second UE 1060 based on the resource allocation, a first request associated with the sidelink communication pattern, e.g., as described in connection with 706 of FIG. 7. The scheduling component 1012 may determine, based on a first schedule associated with the apparatus 1002, whether to confirm the first request associated with the sidelink communication, e.g., as described in connection with 708 of FIG. 7. The transmission component 1006 may send, to the second UE 1060, a confirmation of the first request associated with the sidelink communication pattern when the first request is determined to be confirmed or a second request associated with the sidelink communication pattern, e.g., as described in connection with 710 of FIG. 7. The sidelink pattern component 1008 may determine the sidelink communication pattern based on the first request or the second request.

In some aspects, the sidelink communication pattern may indicate a first slot in which the apparatus 1002 is to transmit to the second UE 1060. The transmission component 1006 may send, to the second UE 1060 in the first slot on the first sidelink channel, information indicating a schedule associated with a second sidelink channel, e.g., as described in connection with 802 of FIG. 8. The transmission component 1006 may send data to the second UE 1060 on the second sidelink channel based on the schedule associated with the second sidelink channel, e.g., as described in connection with 804 of FIG. 8.

In some other aspects, the sidelink communication pattern may indicate a second slot in which the apparatus 1002 is to receive from the second UE 1060. The reception component 1004 may receive, from the second UE 1060 in the second slot on the first sidelink channel, information indicating a schedule associated with the second sidelink channel, e.g., as described in connection with 804 of FIG. 8. The reception component 1004 may receive data from the second UE 1060 on the second sidelink channel based on the schedule associated with the second sidelink channel, e.g., as described in connection with 808 of FIG. 8.

The apparatus may include additional components that perform each of the blocks of the algorithm in the aforementioned flowcharts of FIGS. 6-8. As such, each block in the aforementioned flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
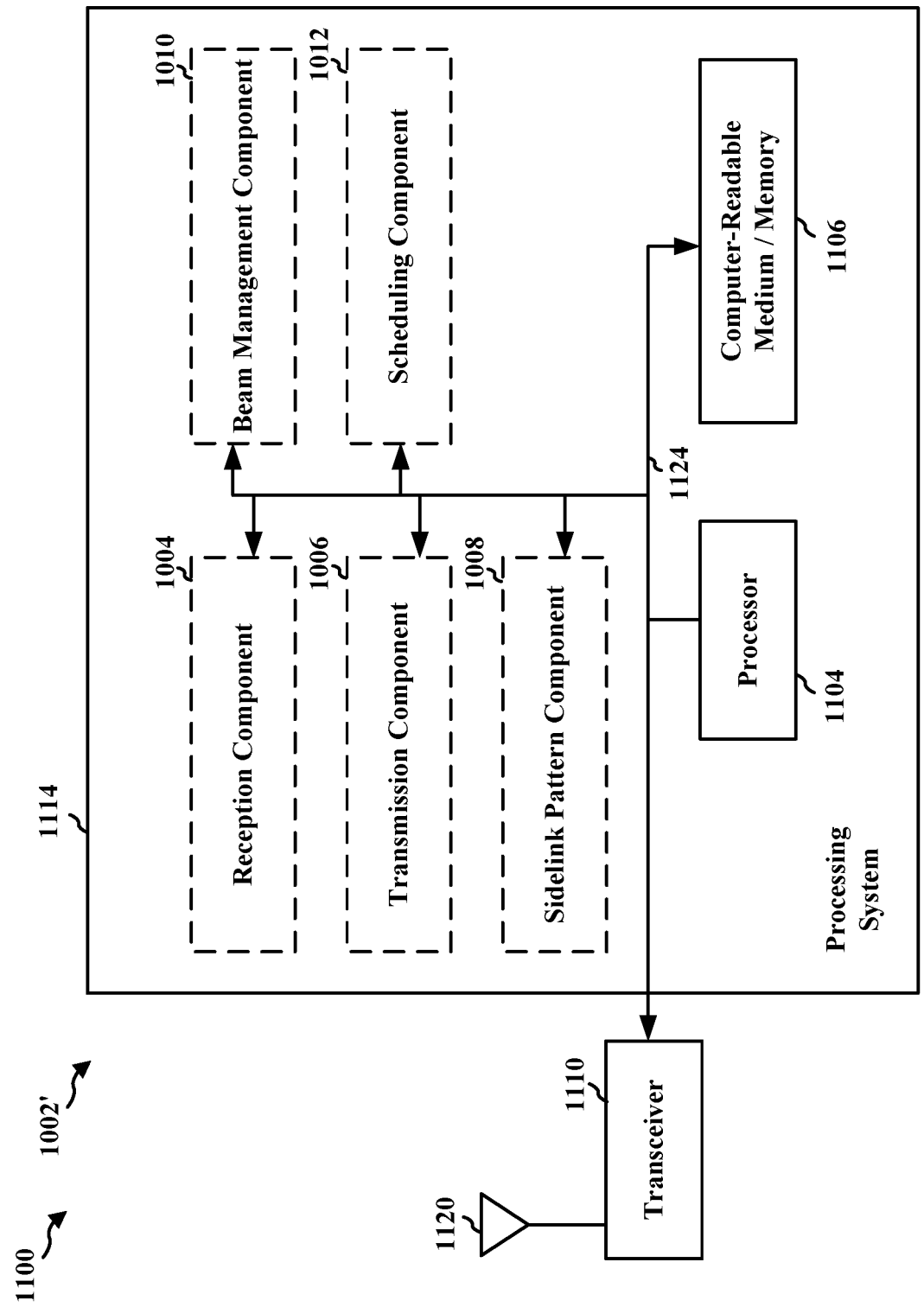
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving, from a base station, information associated with sidelink communication; means for determining, based on the information associated with sidelink communication, a sidelink communication pattern associated with a second UE; and means for communicating with the second UE on a first sidelink channel based on the sidelink communication pattern associated with the second UE. In one aspect, the information associated with sidelink communication indicates a resource allocation associated with sidelink communication.

In one aspect, the apparatus 1002/1002' may further include means for sending, to the second UE based on the resource allocation, a first request associated with the sidelink communication pattern based on a first schedule associated with the apparatus 1002/1002'; and means for receiving, from the second UE, one of a confirmation of the first request associated with the sidelink communication pattern or a second request associated with the sidelink communication pattern, and the sidelink communication pattern is determined based on the first request or the second request.

In one aspect, the apparatus 1002/1002' may further include means for receiving, from the second UE based on the resource allocation, a first request associated with the sidelink communication pattern; means for determining, based on a first schedule associated with the apparatus 1002/1002', whether to confirm the first request associated with the sidelink communication pattern; and means for sending, to the second UE, a confirmation of the first request associated with the sidelink communication pattern when the first request is determined to be confirmed or a second request associated with the sidelink communication pattern, and the sidelink communication pattern is determined based on the first request or the second request.

In one aspect, the resource allocation is semi-statically allocated by the base station. In one aspect, the resource allocation is associated with a timescale of at least 100 ms. In one aspect, the information associated with sidelink communication does not schedule any UEs on the resource allocation associated with sidelink communication.

In one aspect, the sidelink communication pattern indicates a slot in which the apparatus 1002/1002' is to transmit to the second UE, and the means for communicating with the second UE on the first sidelink channel based on the sidelink communication pattern associated with the second UE is configured to: send, to the second UE in the slot on the first sidelink channel, information indicating a schedule associated with a second sidelink channel; and send data to the second UE on the second sidelink channel based on the schedule associated with the second sidelink channel.

In one aspect, the sidelink communication pattern indicates a slot in which the apparatus 1002/1002' is to receive from the second UE, and the means for communicating with the second UE on the first sidelink channel based on the sidelink communication pattern associated with the second UE is configured to: receive, from the second UE in the slot on the first sidelink channel, information indicating a schedule associated with a second sidelink channel; and receive data from the second UE on the second sidelink channel based on the schedule associated with the second sidelink channel.

In one aspect, the apparatus 1002/1002' may further include means for determining a beam associated with the communication with the second UE based on the sidelink communication pattern.

In one aspect, the apparatus 1002/1002' may further include means for sending, to the base station, a request associated with the communicating with the second UE on the first sidelink channel; and means for receiving, from the base station based on the request, the sidelink communication pattern associated with the second UE, and the determination of the sidelink communication pattern associated with the second UE is based on the received information indicating the sidelink communication pattern.

In one aspect, the sidelink communication pattern indicates a slot in which the apparatus 1002/1002' is to transmit to the second UE, and the means for communicating with the second UE on the first sidelink channel based on the sidelink communication pattern associated with the second UE is configured to: send, to the second UE in the slot on the first sidelink channel, information indicating a schedule associated with a second sidelink channel; and send data to the second UE on the second sidelink channel based on the schedule associated with the second sidelink channel.

In one aspect, the sidelink communication pattern indicates a slot in which the apparatus 1002/1002' is to receive from the second UE, and the means for communicating with the second UE on the first sidelink channel based on the sidelink communication pattern associated with the second UE is configured to: receive, from the second UE in the slot on the first sidelink channel, information indicating a schedule associated with a second sidelink channel; and receive data from the second UE on the second sidelink channel based on the schedule associated with the second sidelink channel.

In one aspect, the request associated with the communication with the second UE on the first sidelink channel indicates at least one of QoS associated with the communication with the second UE on the first sidelink channel or a relative priority associated with the communication with the second UE on the first sidelink channel.

In one aspect, the sidelink communication pattern is associated with a timescale of at least 100 ms.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
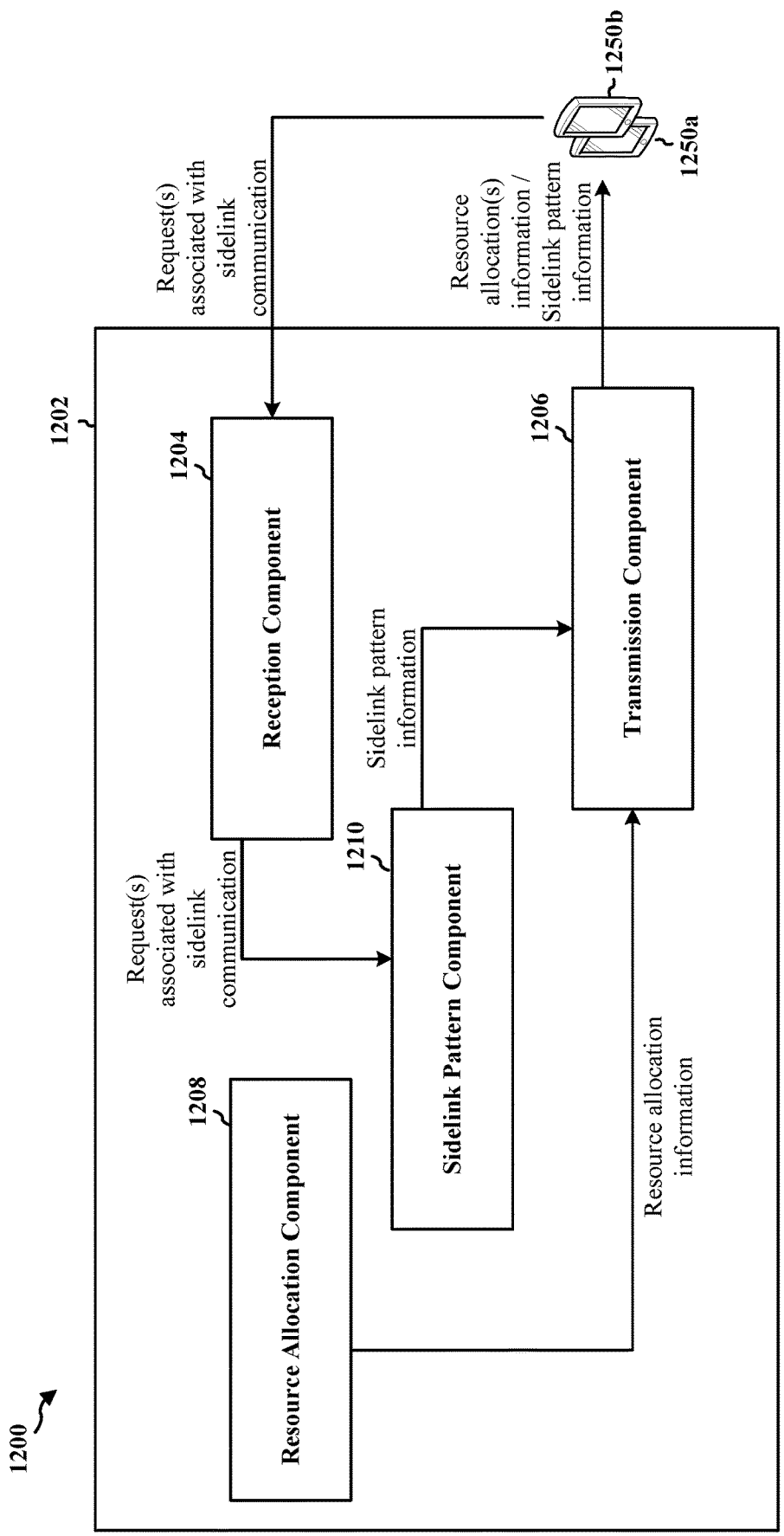
FIG. 12 is a conceptual data flow diagram illustrating the data flow between different means/components in an example apparatus.

FIG. 12 is a conceptual data flow diagram illustrating an example data flow 1200 between different means/components in an example apparatus 1202. The apparatus 1202 may be a base station.

The apparatus 1202 may include a resource allocation component 1208 that determines a resource allocation associated with sidelink communication, e.g., as described in connection with 902 of FIG. 9. The resource allocation pattern may be associated with a timescale of at least 100 ms. The resource allocation may be semi-statically determined.

The apparatus 1202 may further include a transmission component 1206 that broadcasts information indicating the resource allocation associated with sidelink communication, e.g., as described in connection with 904 of FIG. 9. The resource allocation component 1208 may be configured to refrain from scheduling any UE on the resource allocation associated with sidelink communication, e.g., as described in connection with 906 of FIG. 9.

The apparatus 1202 may include a reception component 1204 that receives, from each of a plurality of UEs 1250a-b, a respective request associated with sidelink communication, e.g., as described in connection with 908 of FIG. 9.

The apparatus 1202 may further include a sidelink pattern component 1210 that determines a sidelink communication pattern based on each request associated with sidelink communication, e.g., as described in connection with 910 of FIG. 9. The sidelink communication pattern may be associated with a timescale of at least 100 ms. In some aspects, at least one of the respective requests indicates at least one of a QoS associated with the sidelink communication or a relative priority associated with the sidelink communication, and the sidelink communication pattern is determined based on at least one of the QoS or the relative priority.

The transmission component 1206 may send, to each of the plurality of UEs 1250a-b, information indicating the sidelink communication pattern, e.g., as described in connection with 912 of FIG. 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
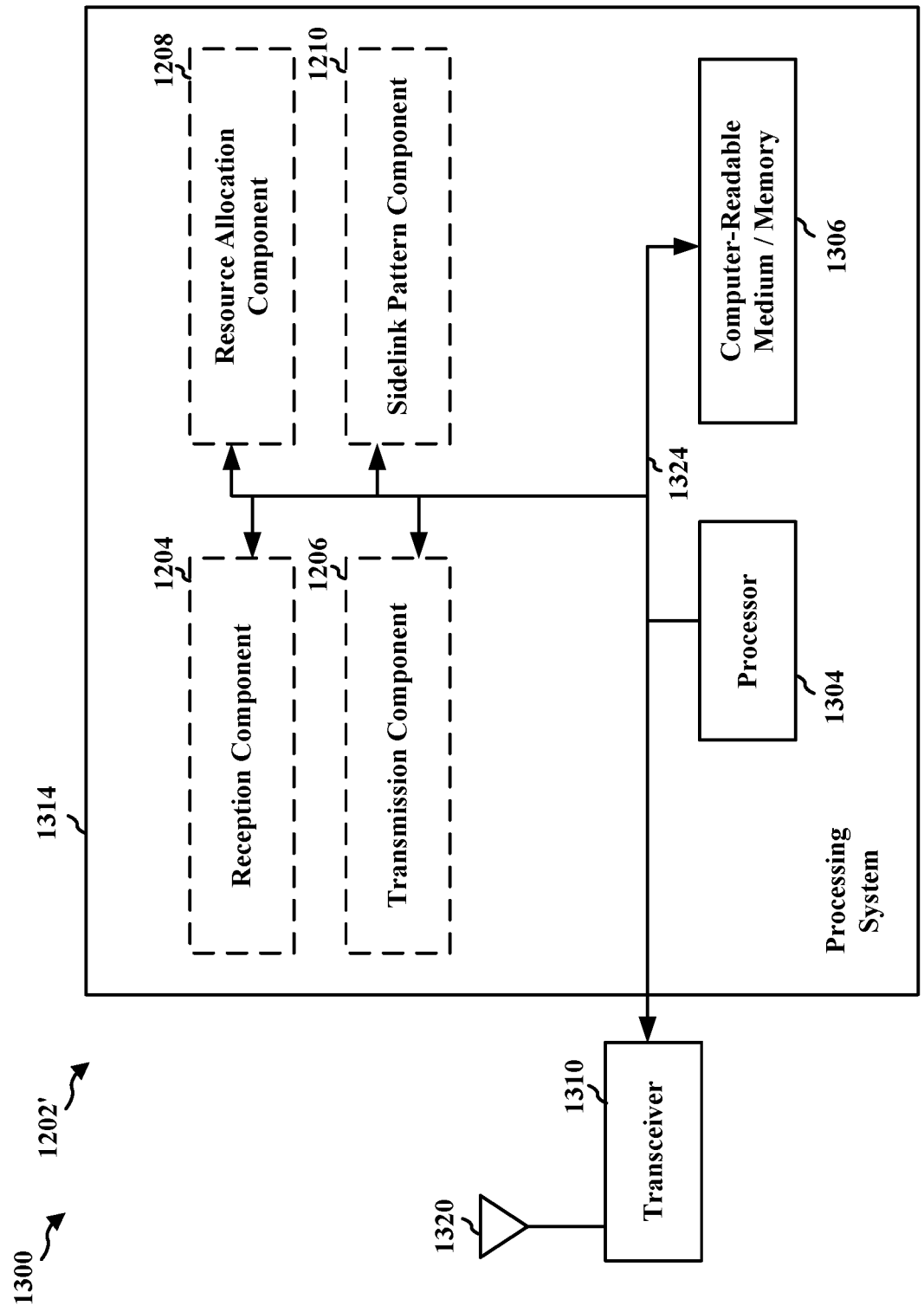
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for determining a resource allocation associated with sidelink communication; means for broadcasting information indicating the resource allocation associated with sidelink communication; and means for refraining from scheduling any UE on the resource allocation associated with sidelink communication.

In one aspect, the apparatus 1202/1202' may further include means for receiving, from each of a plurality of UEs, a respective request associated with the sidelink communication; means for determining a sidelink communication pattern based on each request associated with the sidelink communication; and means for sending, to each of the plurality of UEs, information indicating the sidelink communication pattern.

In one aspect, at least one of the respective requests indicates at least one of a QoS associated with the sidelink communication or a relative priority associated with the sidelink communication, and the sidelink communication pattern is determined based on at least one of the QoS or the relative priority.

In one aspect, the sidelink communication pattern is associated with a timescale of at least 100 milliseconds.

In one aspect, the resource allocation is associated with a timescale of at least 100 milliseconds.

In one aspect, the resource allocation is semi-statically determined.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

As described in the present disclosure, example 1 may be a first UE configured to receive, from a base station, information associated with sidelink communication; determine, based on the information associated with sidelink communication, a sidelink communication pattern associated with a second UE; and communicate with the second UE on a first sidelink channel based on the sidelink communication pattern associated with the second UE.

Example 2 may be the first UE of example 1, and the information associated with sidelink communication indicates a resource allocation associated with sidelink communication. Example 3 may be the first UE of example 2, and further configured to send, to the second UE based on the resource allocation, a first request associated with the sidelink communication pattern based on a first schedule associated with the first UE; and receive, from the second UE, one of a confirmation of the first request associated with the sidelink communication pattern or a second request associated with the sidelink communication pattern, and the sidelink communication pattern is determined based on the first request or the second request. Example 4 may be the first UE of example 2, and further configured to receive, from the second UE based on the resource allocation, a first request associated with the sidelink communication pattern; determine, based on a first schedule associated with the first UE, whether to confirm the first request associated with the sidelink communication pattern; and send, to the second UE, a confirmation of the first request associated with the sidelink communication pattern when the first request is determined to be confirmed or a second request associated with the sidelink communication pattern, and the sidelink communication pattern is determined based on the first request or the second request. Example 5 may be the first UE of any of examples 2 through 4, and the resource allocation is semi-statically allocated by the base station. Example 6 may be the first UE of any of examples 2 through 5, and the resource allocation is associated with a timescale of at least 100 milliseconds. Example 7 may be the first UE of any of examples 2 through 5, and the information associated with sidelink communication does not schedule any UEs on the resource allocation associated with sidelink communication.

Example 8 may be the first UE of any of examples 1 through 7, and the sidelink communication pattern indicates a slot in which the first UE is to transmit to the second UE, and the communication with the second UE on the first sidelink channel based on the sidelink communication pattern associated with the second UE includes to: send, to the second UE in the slot on the first sidelink channel, information indicating a schedule associated with a second sidelink channel; and send data to the second UE on the second sidelink channel based on the schedule associated with the second sidelink channel.

Example 9 may be the first UE of any of examples 1 through 7, and the sidelink communication pattern indicates a slot in which the first UE is to receive from the second UE, and wherein the communication with the second UE on the first sidelink channel based on the sidelink communication pattern associated with the second UE includes to: receive, from the second UE in the slot on the first sidelink channel, information indicating a schedule associated with a second sidelink channel; and receive data from the second UE on the second sidelink channel based on the schedule associated with the second sidelink channel.

Example 10 may be the first UE of any of examples 1 through 9, and the first UE may be further configured to determine a beam associated with the communication with the second UE based on the sidelink communication pattern.

Example 11 may be the first UE of any of examples 1 through 10, and the first UE may be further configured to: send, to the base station, a request associated with the communicating with the second UE on the first sidelink channel; and receive, from the base station based on the request, information indicating the sidelink communication pattern associated with the second UE, and the determination of the sidelink communication pattern associated with the second UE is based on the received information indicating the sidelink communication pattern.

Example 12 may be the first UE of any of examples 1 through 11, and the sidelink communication pattern indicates a slot in which the first UE is to transmit to the second UE, and the communication with the second UE on the first sidelink channel based on the sidelink communication pattern associated with the second UE includes to: send, to the second UE in the slot on the first sidelink channel, information indicating a schedule associated with a second sidelink channel; and send data to the second UE on the second sidelink channel based on the schedule associated with the second sidelink channel.

Example 13 may be the first UE of any of examples 1 through 11, and the sidelink communication pattern indicates a slot in which the first UE is to receive from the second UE, and the communication with the second UE on the first sidelink channel based on the sidelink communication pattern associated with the second UE includes to: receive, from the second UE in the slot on the first sidelink channel, information indicating a schedule associated with a second sidelink channel; and receive data from the second UE on the second sidelink channel based on the schedule associated with the second sidelink channel.

Example 14 may be the first UE of example 13, and the request associated with the communication with the second UE on the first sidelink channel indicates at least one of a QoS associated with the communication with the second UE on the first sidelink channel or a relative priority associated with the communication with the second UE on the first sidelink channel.

Example 15 may be the first UE of any of examples 1 through 14, and the sidelink communication pattern is associated with a timescale of at least 100 milliseconds.

Example 16 may be a base station that is configured to: determine a resource allocation associated with sidelink communication; broadcast information indicating the resource allocation associated with sidelink communication; and refrain from scheduling any UE on the resource allocation associated with sidelink communication.

Example 17 may be the base station of example 16, and the base station is further configured to: receive, from each of a plurality of UEs, a respective request associated with the sidelink communication; determine a sidelink communication pattern based on each request associated with the sidelink communication; and send, to each of the plurality of UEs, information indicating the sidelink communication pattern. Example 18 may be the base station of any of examples 16 through 17, and at least one of the respective requests indicates at least one of a QoS associated with the sidelink communication or a relative priority associated with the sidelink communication, and wherein the sidelink communication pattern is determined based on at least one of the QoS or the relative priority. Example 19 may be the base station of any of examples 16 through 18, and the sidelink communication pattern is associated with a timescale of at least 100 milliseconds. Example 20 may be the base station of any of examples 16 through 19, and the resource allocation is associated with a timescale of at least 100 milliseconds. Example 21 may be the base station of any of examples 16 through 20, and the resource allocation is semi-statically determined.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first user equipment (UE), the method comprising:
   receiving, from a base station, information associated with sidelink communication, wherein the information associated with sidelink communication indicates a resource allocation associated with sidelink communication;
   when a sidelink communication pattern is configured in a centralized manner,
      sending, to the base station, a request associated with communicating with a second UE on a first sidelink channel, wherein the centralized manner comprises the base station assisting sidelink communication between UEs by determining the sidelink communication pattern, wherein the sidelink communication pattern indicates a slot in which the second UE is a transmitter or a receiver for the sidelink communication, and
      receiving, from the base station, the sidelink communication pattern associated with the second UE;
   when the sidelink communication pattern is configured in a distributed manner and that the first UE is a transmitting UE,
      sending, to the second UE based on the resource allocation, a first request associated with the sidelink communication pattern associated with the second UE based on a first schedule associated with the first UE; and
      receiving, from the second UE, one of a confirmation of the first request associated with the sidelink communication pattern associated with the second UE or a second request associated with the sidelink communication pattern associated with the second UE, wherein the sidelink communication pattern associated with the second UE is determined based on the first request or the second request, wherein the distributed manner comprises the base station refraining from scheduling any UEs on the resource allocation associated with the sidelink communication;
   when the sidelink communication pattern is configured in the distributed manner and that the first UE is a receiving UE,
      receiving, from the second UE based on the resource allocation, a first request associated with the sidelink communication pattern associated with the second UE;
      determining, based on a first schedule associated with the first UE, whether to confirm the first request associated with the sidelink communication pattern associated with the second UE; and
      sending, to the second UE, a confirmation of the first request associated with the sidelink communication pattern associated with the second UE when the first request is determined to be confirmed or a second request associated with the sidelink communication pattern, wherein the sidelink communication pattern associated with the second UE is determined based on the first request or the second request;
   determining, based on the information associated with sidelink communication, the sidelink communication pattern associated with the second UE; and
   communicating with the second UE on the first sidelink channel using at least one beam that is determined based on the sidelink communication pattern associated with the second UE.

2. The method of claim 1, wherein the resource allocation is semi-statically allocated by the base station.

3. The method of claim 1, wherein the resource allocation is associated with a timescale of at least 100 milliseconds.

4. The method of claim 1, wherein the sidelink communication pattern configured in the distributed manner indicates a slot in which the first UE is to transmit to the second UE, and wherein the communicating with the second UE on the first sidelink channel based on the sidelink communication pattern associated with the second UE comprises:
   sending, to the second UE in the slot on the first sidelink channel, information indicating a schedule associated with a second sidelink channel; and
   sending data to the second UE on the second sidelink channel based on the schedule associated with the second sidelink channel.

5. The method of claim 1, wherein the sidelink communication pattern configured in the distributed manner indicates a slot in which the first UE is to receive from the second UE, and wherein the communicating with the second UE on the first sidelink channel based on the sidelink communication pattern associated with the second UE comprises:
   receiving, from the second UE in the slot on the first sidelink channel, information indicating a schedule associated with a second sidelink channel; and
   receiving data from the second UE on the second sidelink channel based on the schedule associated with the second sidelink channel.

6. The method of claim 1, further comprising:
   determining the at least one beam associated with the communicating with the second UE based on the sidelink communication pattern associated with the second UE.

7. The method of claim 1,
   Wherein the sidelink communication pattern associated with the second UE is received from the base station based on the request.

8. The method of claim 7, wherein the sidelink communication pattern associated with the second UE indicates a slot in which the first UE is to transmit to the second UE, and wherein the communicating with the second UE on the first sidelink channel based on the sidelink communication pattern associated with the second UE comprises:
   sending, to the second UE in the slot on the first sidelink channel, information indicating a schedule associated with a second sidelink channel; and
   sending data to the second UE on the second sidelink channel based on the schedule associated with the second sidelink channel.

9. The method of claim 1, wherein the sidelink communication pattern configured in the distributed manner indicates a slot in which the first UE is to receive from the second UE, and wherein the communicating with the second UE on the first sidelink channel based on the sidelink communication pattern associated with the second UE comprises:
    receiving, from the second UE in the slot on the first sidelink channel, information indicating a schedule associated with a second sidelink channel; and
    receiving data from the second UE on the second sidelink channel based on the schedule associated with the second sidelink channel.

10. The method of claim 7, wherein the request associated with the communicating with the second UE on the first sidelink channel indicates at least one of a quality of service (QOS) associated with the communicating with the second UE on the first sidelink channel or a relative priority associated with the communicating with the second UE on the first sidelink channel.

11. The method of claim 1, wherein the sidelink communication pattern associated with the second UE is associated with a timescale of at least 100 milliseconds.

12. A method of wireless communication by a base station, the method comprising:
    determining a resource allocation associated with sidelink communication, wherein the resource allocation is adaptively allocated for sidelink communication on a slow time scale indicating a duration for which the resource allocation for sidelink communication is valid;
    broadcasting information indicating the resource allocation associated with sidelink communication;
    when the sidelink communication is scheduled in a centralized manner,
        receiving, from each of a plurality of user equipment (UEs), a respective request associated with the sidelink communication,
        facilitating the sidelink communication by generating a sidelink communication pattern based on each request associated with the sidelink communication, wherein the sidelink communication pattern indicates a slot in which one of the UEs is a transmitter or a receiver for the sidelink communication, and
        sending, to each of the plurality of UEs, information indicating the sidelink communication pattern for a plurality of slots associated with the sidelink communication, wherein the centralized manner comprises the base station assisting sidelink communication between UEs by determining the sidelink communication pattern; and
    when the sidelink communication is scheduled in a distributed manner, refraining from scheduling any UEs on the resource allocation associated with the sidelink communication, wherein the distributed manner comprises the base station refraining from scheduling any UEs on the resource allocation associated with the sidelink communication, wherein at least one of the respective requests indicates at least one of a quality of service (QOS) associated with the sidelink communication, wherein the sidelink communication pattern is determined based on the QoS.

13. The method of claim 12, wherein at least one of the respective requests further indicates a relative priority associated with the sidelink communication, and wherein the sidelink communication pattern is determined based on the relative priority.

14. The method of claim 12, wherein the sidelink communication pattern is associated with a timescale of at least 100 milliseconds.

15. The method of claim 12, wherein the resource allocation is associated with a timescale of at least 100 milliseconds.

16. An apparatus for wireless communication by a first user equipment (UE), comprising:
    a memory; and
    at least one processor coupled to the memory and configured to:
        receive, from a base station, information associated with sidelink communication, wherein the information associated with sidelink communication indicates a resource allocation associated with sidelink communication;
        when a sidelink communication pattern is configured in a centralized manner,
            send, to the base station, a request associated with communicating with a second UE on a first sidelink channel, wherein the centralized manner comprises the base station assisting sidelink communication between UEs by determining the sidelink communication pattern, wherein the sidelink communication pattern indicates a slot in which the second UE is a transmitter or a receiver for the sidelink communication, and
            receive, from the base station, the sidelink communication pattern associated with the second UE;
        when the sidelink communication pattern is configured in a distributed manner and that the first UE is a transmitting UE,
            send, to the second UE based on the resource allocation, a first request associated with the sidelink communication pattern associated with the second UE based on a first schedule associated with the first UE; and
            receive, from the second UE, one of a confirmation of the first request associated with the sidelink communication pattern associated with the second UE or a second request associated with the sidelink communication pattern associated with the second UE, wherein the sidelink communication pattern associated with the second UE is determined based on the first request or the second request, wherein the distributed manner comprises the base station refraining from scheduling any UEs on the resource allocation associated with the sidelink communication;
        when the sidelink communication pattern is configured in the distributed manner and that the first UE is a receiving UE,
            receive, from the second UE based on the resource allocation, a first request associated with the sidelink communication pattern associated with the second UE;
            determine, based on a first schedule associated with the first UE, whether to confirm the first request associated with the sidelink communication pattern associated with the second UE; and
            send, to the second UE, a confirmation of the first request associated with the sidelink communication pattern associated with the second UE when the first request is determined to be confirmed or a second request associated with the sidelink communication pattern, wherein the sidelink communication pattern associated with the second UE is determined based on the first request or the second request;

determine, based on the information associated with sidelink communication, the sidelink communication pattern associated with the second UE; and communicate with the second UE on the first sidelink channel using at least one beam that is determined based on the sidelink communication pattern associated with the second UE.

17. The apparatus of claim 16, wherein the information associated with sidelink communication indicates a resource allocation associated with sidelink communication.

18. The apparatus of claim 17, wherein the resource allocation is semi-statically allocated by the base station.

19. The apparatus of claim 17, wherein the resource allocation is associated with a timescale of at least 100 milliseconds.

20. An apparatus for wireless communication by a base station, comprising:

a memory; and at least one processor coupled to the memory and configured to:

determine a resource allocation associated with sidelink communication, wherein the resource allocation is adaptively allocated for sidelink communication on a slow time scale indicating a duration for which the resource allocation for sidelink communication is valid;

broadcast information indicating the resource allocation associated with sidelink communication;

when the sidelink communication is scheduled in a centralized manner, receive, from each of a plurality of user equipment (UEs), a respective request associated with the sidelink communication, and facilitate the sidelink communication by generating a sidelink communication pattern based on each request associated with the sidelink communication, wherein the sidelink communication pattern indicates a slot in which one of the UEs is a transmitter or a receiver for the sidelink communication; and send, to each of the plurality of UEs, information indicating a sidelink communication pattern for a plurality of slots associated with the sidelink communication, wherein the centralized manner comprises the base station assisting sidelink communication between UEs by determining the sidelink communication pattern; and when the sidelink communication is scheduled in a distributed manner, refraining from scheduling any UEs on the resource allocation associated with the sidelink communication, wherein the distributed manner comprises the base station refraining from scheduling any UEs on the resource allocation associated with the sidelink communication, wherein at least one of the respective requests indicates at least one of a quality of service (QOS) associated with the sidelink communication, wherein the sidelink communication pattern is determined based on the QoS.

21. The apparatus of claim 20, wherein at least one of the respective requests indicates a relative priority associated with the sidelink communication, and wherein the sidelink communication pattern is determined based on the relative priority.

* * * * *